(12) United States Patent
Chavez et al.

(10) Patent No.: US 9,946,679 B2
(45) Date of Patent: *Apr. 17, 2018

(54) DISTRIBUTED AUDIO COORDINATION OVER A TWO-WIRE COMMUNICATION BUS

(71) Applicant: ANALOG DEVICES, INC., Norwood, MA (US)

(72) Inventors: Miguel Chavez, Cambridge, MA (US); Martin Kessler, Salem, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 234 days.

This patent is subject to a terminal disclaimer.

(21) Appl. No.: 14/884,947

(22) Filed: Oct. 16, 2015

(65) Prior Publication Data

US 2016/0034417 A1 Feb. 4, 2016

Related U.S. Application Data

(63) Continuation of application No. 14/063,886, filed on Oct. 25, 2013, now Pat. No. 9,448,959, which is a
(Continued)

(51) Int. Cl.
*G06F 13/00* (2006.01)
*G06F 13/42* (2006.01)
(Continued)

(52) U.S. Cl.
CPC ....... *G06F 13/426* (2013.01); *G05B 19/0421* (2013.01); *G05B 19/0423* (2013.01);
(Continued)

(58) Field of Classification Search
CPC ........ G06F 13/426; G06F 1/26; G06F 13/364; G06F 13/4282; G06F 13/4295;
(Continued)

(56) References Cited

U.S. PATENT DOCUMENTS 4,317,211 A 2/1982 Quesnell, Jr.
4,542,420 A 9/1985 Kozlik et al.
(Continued)

FOREIGN PATENT DOCUMENTS

CN 1821913 8/2006
CN 200944109 Y 9/2007
(Continued)

OTHER PUBLICATIONS

OA1 issued in CN Patent Application Serial No. 201410323230.1 dated Jun. 27, 2016 including English Summary of Relevance, 4 pages.
(Continued)

*Primary Examiner* — Paul R Myers
(74) *Attorney, Agent, or Firm* — Patent Capital Group

(57) ABSTRACT

Disclosed herein are systems and technique for distributed audio coordination over a two-wire communication bus. For example, in some embodiments, a first slave device may include circuitry to receive, over a two-wire bus a synchronization control frame, audio data, and a dynamics processor (DP) parameter for a second audio device coupled to a second slave device. The first slave device may include circuitry to derive timing information from the synchronization control frame, and circuitry to provide the audio data and a DP parameter (based on the DP parameter for the second audio device) to a first audio device coupled to the first slave device.

30 Claims, 22 Drawing Sheets

Related U.S. Application Data continuation of application No. 13/646,397, filed on Oct. 5, 2012, now Pat. No. 9,417,944, and a continuation of application No. 13/646,382, filed on Oct. 5, 2012, now Pat. No. 8,990,464.

(60) Provisional application No. 61/843,891, filed on Jul. 8, 2013, provisional application No. 61/843,896, filed on Jul. 8, 2013, provisional application No. 61/843,902, filed on Jul. 8, 2013, provisional application No. 61/845,542, filed on Jul. 12, 2013, provisional application No. 61/543,379, filed on Oct. 5, 2011, provisional application No. 61/543,380, filed on Oct. 5, 2011, provisional application No. 62/065,724, filed on Oct. 19, 2014, provisional application No. 62/065,736, filed on Oct. 19, 2014, provisional application No. 62/065,738, filed on Oct. 19, 2014.

(51) Int. Cl.
*G06F 13/364* (2006.01)
*G06F 1/26* (2006.01)
*G05B 19/042* (2006.01)
*G05B 19/418* (2006.01)
*H04B 3/54* (2006.01)
*H04L 12/403* (2006.01)
*H04R 29/00* (2006.01)

(52) U.S. Cl.
CPC ........... *G05B 19/4185* (2013.01); *G06F 1/26* (2013.01); *G06F 13/364* (2013.01); *G06F 13/4282* (2013.01); *G06F 13/4291* (2013.01); *G06F 13/4295* (2013.01); *H04B 3/542* (2013.01); *H04B 3/548* (2013.01); *H04L 12/4035* (2013.01); *H04B 2203/547* (2013.01); *H04R 29/007* (2013.01); *Y02B 60/1228* (2013.01); *Y02B 60/1235* (2013.01)

(58) Field of Classification Search
CPC ............ G05B 19/0421; G05B 19/4185; H04B 3/542; H04B 3/548; H04L 12/4035
USPC ......................................................... 710/110
See application file for complete search history.

(56) References Cited

U.S. PATENT DOCUMENTS

| | | | |
|---|---|---|---|
| 4,584,487 A | 4/1986 | Hesse et al. | |
| 4,675,884 A | 6/1987 | Nakamura et al. | |
| 4,840,448 A | 6/1989 | Thiennot | |
| 4,860,309 A | 8/1989 | Costello | |
| 4,965,881 A | 10/1990 | Dilley | |
| 5,056,114 A | 10/1991 | Wight | |
| 5,168,511 A | 12/1992 | Boles | |
| 5,235,595 A | 9/1993 | O'Dowd | |
| 5,412,652 A | 5/1995 | Lu | |
| 5,446,765 A | 8/1995 | Leger | |
| 5,675,811 A | 10/1997 | Broedner et al. | |
| 5,696,800 A | 12/1997 | Berger | |
| 5,793,993 A | 8/1998 | Broedner | |
| 5,805,632 A | 9/1998 | Leger | |
| 5,819,051 A | 10/1998 | Murray | |
| 5,841,989 A | 11/1998 | James et al. | |
| 5,935,229 A | 8/1999 | Duval | |
| 5,974,475 A | 10/1999 | Day | |
| 5,982,297 A | 11/1999 | Welle | |
| 6,008,746 A | 12/1999 | White | |
| 6,085,258 A | 7/2000 | Dreyer | |
| 6,115,831 A | 9/2000 | Hanf et al. | |
| 6,240,478 B1 | 5/2001 | Brickell | |
| 6,285,722 B1 | 9/2001 | Banwell et al. | |
| 6,298,104 B1 | 10/2001 | Saeki | |
| 6,326,851 B1 | 12/2001 | Staszewski et al. | |
| 6,363,437 B1 | 3/2002 | Ptasinski | |
| 6,370,212 B1 | 4/2002 | Nakai | |
| 6,611,537 B1* | 8/2003 | Edens ................. H04L 12/2803 348/E7.05 |
| 6,609,167 B1 | 9/2003 | Bastiani et al. | |
| 6,628,212 B1 | 9/2003 | Toutant | |
| 6,629,172 B1 | 9/2003 | Andersson et al. | |
| 6,745,270 B1 | 6/2004 | Barenys et al. | |
| 6,813,777 B1 | 11/2004 | Weinberger et al. | |
| 6,834,321 B2 | 12/2004 | Yokoyama | |
| 6,928,501 B2 | 8/2005 | Andreas et al. | |
| 6,937,957 B2 | 8/2005 | Viard | |
| 6,947,335 B2 | 9/2005 | Nakamura et al. | |
| 6,987,824 B1 | 1/2006 | Boerstler | |
| 6,985,503 B1 | 6/2006 | DeGrandpre et al. | |
| 7,061,926 B2 | 6/2006 | Breinlinger | |
| 7,073,458 B2 | 7/2006 | SjÖlund et al. | |
| 7,095,860 B1* | 8/2006 | Kemp ....................... G10H 1/46 381/102 |
| 7,177,661 B2 | 2/2007 | Shpak | |
| 7,249,209 B2 | 7/2007 | Yang | |
| 7,315,551 B2 | 1/2008 | Olson | |
| 7,348,803 B2 | 3/2008 | Bui | |
| 7,395,362 B2 | 7/2008 | Barta | |
| 7,487,331 B2 | 2/2009 | Thomsen | |
| 7,514,962 B2 | 4/2009 | Kumar | |
| 7,539,804 B2 | 5/2009 | Miura | |
| 7,555,016 B2 | 6/2009 | Page | |
| 7,567,642 B2 | 7/2009 | White | |
| 7,574,234 B2 | 8/2009 | Conyers | |
| 7,587,539 B2 | 9/2009 | Picard | |
| 7,631,110 B2 | 12/2009 | Berenbaum | |
| 7,656,956 B2 | 2/2010 | King | |
| 7,664,015 B2 | 2/2010 | Price et al. | |
| 7,673,084 B2 | 3/2010 | Krampl et al. | |
| 7,685,449 B2 | 3/2010 | Terasawa | |
| 7,702,832 B2 | 4/2010 | Bohm | |
| 7,707,339 B2 | 4/2010 | Pigott | |
| 7,715,450 B2 | 5/2010 | Ohara | |
| 7,802,036 B2 | 9/2010 | Takeuchi | |
| 7,818,457 B1 | 10/2010 | Flood et al. | |
| 7,827,335 B2 | 11/2010 | Liao | |
| 7,835,462 B2 | 11/2010 | Oishi | |
| 7,844,690 B1 | 11/2010 | Durham et al. | |
| 7,890,684 B2 | 2/2011 | Berenbaum | |
| 7,931,198 B2 | 4/2011 | Hall | |
| 8,055,825 B2 | 11/2011 | Bohm | |
| 8,060,678 B2 | 11/2011 | Bohm | |
| 8,147,338 B2 | 4/2012 | Hutchison-Kay | |
| 8,149,882 B2 | 4/2012 | Huber et al. | |
| 8,156,274 B2 | 4/2012 | Kapelner | |
| 8,185,680 B2 | 5/2012 | Drexler | |
| 8,185,759 B1 | 5/2012 | Li | |
| 8,205,017 B2 | 6/2012 | Parr et al. | |
| 8,225,207 B1* | 7/2012 | Ramirez ............. G06F 3/04847 715/202 |
| 8,229,301 B2 | 7/2012 | Hahin | |
| 8,230,118 B2 | 7/2012 | Toba | |
| 8,307,137 B2 | 11/2012 | Liao | |
| 8,384,568 B2 | 2/2013 | Govindammagari et al. | |
| 8,391,180 B2 | 3/2013 | Karandikar | |
| 8,416,903 B1 | 4/2013 | Oh et al. | |
| 8,478,917 B2 | 7/2013 | Scott | |
| 8,485,703 B2 | 7/2013 | Eckel | |
| 8,543,740 B2 | 9/2013 | Lotzenburger et al. | |
| 8,582,598 B2 | 11/2013 | Binder | |
| 8,600,583 B2 | 12/2013 | Fervel | |
| 8,605,623 B2 | 12/2013 | Simmons et al. | |
| 8,615,091 B2 | 12/2013 | Terwal | |
| 8,643,290 B2 | 2/2014 | Liu | |
| 8,667,194 B2 | 3/2014 | Dybsetter | |
| 8,692,487 B2 | 4/2014 | Eckel | |
| 8,745,305 B2 | 6/2014 | Toba | |
| 8,806,083 B2 | 8/2014 | Doorenbos | |
| 8,812,654 B2 | 8/2014 | Gelvin et al. | |
| 8,850,079 B2 | 9/2014 | Fister | |
| 8,990,464 B2 | 3/2015 | Kessler | |

(56) References Cited

U.S. PATENT DOCUMENTS

| | | | |
|---|---|---|---|
| 9,059,724 | B2 | 6/2015 | Lahr et al. |
| 9,197,226 | B2 | 11/2015 | Lahr |
| 9,417,944 | B2 | 8/2016 | Kessler |
| 9,654,869 | B2* | 5/2017 | Reiss ............. H04R 3/00 |
| 2002/0009089 | A1 | 1/2002 | McWilliams |
| 2002/0012401 | A1 | 1/2002 | Karolys et al. |
| 2002/0109537 | A1* | 8/2002 | Lee ............. H03L 7/0891 |
| | | | 327/156 |
| 2003/0097482 | A1 | 5/2003 | DeHart et al. |
| 2004/0225812 | A1 | 11/2004 | Ervin |
| 2005/0128962 | A1 | 6/2005 | Dybsetter et al. |
| 2005/0165994 | A1 | 7/2005 | Dickens |
| 2006/0038445 | A1 | 2/2006 | Yanagida |
| 2006/0104396 | A1 | 5/2006 | Soriano et al. |
| 2006/0164266 | A1 | 7/2006 | Riedel et al. |
| 2006/0245454 | A1 | 11/2006 | Balasubramanian et al. |
| 2007/0152628 | A1 | 7/2007 | Lee |
| 2007/0281643 | A1 | 12/2007 | Kawai |
| 2008/0013640 | A1 | 1/2008 | Lu et al. |
| 2008/0016269 | A1 | 1/2008 | Chow et al. |
| 2008/0046121 | A1 | 2/2008 | Pao et al. |
| 2008/0246626 | A1 | 10/2008 | Sheafor et al. |
| 2008/0250175 | A1 | 10/2008 | Sheafor et al. |
| 2008/0250184 | A1 | 10/2008 | Sheafor et al. |
| 2008/0263374 | A1 | 10/2008 | Shah et al. |
| 2009/0021955 | A1 | 1/2009 | Kuang |
| 2009/0116583 | A1 | 5/2009 | Lida et al. |
| 2009/0147864 | A1 | 6/2009 | Lida et al. |
| 2009/0322251 | A1 | 12/2009 | Hilgers |
| 2010/0010504 | A1 | 1/2010 | Simaan et al. |
| 2010/0111082 | A1 | 5/2010 | Janssen et al. |
| 2010/0184575 | A1 | 7/2010 | Williams et al. |
| 2010/0257303 | A1 | 10/2010 | Lee et al. |
| 2010/0260247 | A1 | 10/2010 | Albiston et al. |
| 2011/0028150 | A1 | 2/2011 | Kone |
| 2011/0071676 | A1 | 3/2011 | Sanders et al. |
| 2011/0072162 | A1 | 3/2011 | Rysavy |
| 2012/0076146 | A1 | 3/2012 | Rohatschek et al. |
| 2012/0076319 | A1 | 3/2012 | Terwal |
| 2012/0087503 | A1 | 4/2012 | Watson et al. |
| 2012/0093342 | A1 | 4/2012 | Rupprecht et al. |
| 2012/0102249 | A1 | 4/2012 | Duroiu et al. |
| 2012/0116479 | A1 | 5/2012 | Meskins et al. |
| 2012/0157214 | A1 | 6/2012 | Hutchison-Kay |
| 2012/0183104 | A1 | 7/2012 | Hong et al. |
| 2012/0219099 | A1 | 8/2012 | Loukianov |
| 2012/0257680 | A1 | 10/2012 | Dickens et al. |
| 2012/0275527 | A1 | 11/2012 | Douglass |
| 2013/0069740 | A1 | 3/2013 | Kanasugi et al. |
| 2013/0077724 | A1 | 3/2013 | Dreps et al. |
| 2013/0124763 | A1 | 5/2013 | Kessler |
| 2013/0215799 | A1 | 8/2013 | Binder |
| 2013/0236190 | A1 | 9/2013 | Tanaka et al. |
| 2013/0297829 | A1 | 11/2013 | Berenbaum et al. |
| 2013/0325996 | A1 | 12/2013 | Selig |
| 2014/0067103 | A1 | 3/2014 | Terwal |
| 2014/0095750 | A1 | 4/2014 | Tailliet |
| 2014/0139140 | A1 | 5/2014 | Yeh et al. |
| 2014/0186023 | A1 | 7/2014 | Louderback |
| 2014/0208158 | A1 | 7/2014 | Strumpf |
| 2014/0223054 | A1 | 8/2014 | Hasan et al. |
| 2014/0246993 | A1 | 9/2014 | Catalano et al. |
| 2014/0249695 | A1 | 9/2014 | Gettings et al. |
| 2014/0281077 | A1 | 9/2014 | Biskup |
| 2014/0281078 | A1 | 9/2014 | Biskup |
| 2014/0281079 | A1 | 9/2014 | Biskup |
| 2015/0009050 | A1 | 1/2015 | Lahr |
| 2015/0301968 | A1 | 10/2015 | Kessler |
| 2016/0033416 | A1 | 2/2016 | Chavez et al. |
| 2016/0041941 | A1 | 2/2016 | Kessler et al. |

FOREIGN PATENT DOCUMENTS

| | | |
|---|---|---|
| CN | 201196834 Y | 2/2009 |
| CN | 100551634 C | 10/2009 |
| CN | 201744997 U | 2/2011 |
| CN | 202093392 U | 12/2011 |
| CN | 10367697 A | 9/2012 |
| CN | 202763839 U | 3/2013 |
| CN | 101944750 | 4/2013 |
| CN | 203077287 U | 7/2013 |
| CN | 203225749 U | 10/2013 |
| CN | 102615638 B | 8/2014 |
| CN | ZL201280055576.7 | 6/2016 |
| DE | 102014109156 | 1/2005 |
| EP | 0428869 B1 | 5/1991 |
| EP | 798901 | 10/1997 |
| EP | 1844542 B1 | 10/2007 |
| EP | 2824845 | 1/2015 |
| EP | 2827222 | 1/2015 |
| ES | 2339203 | 9/2007 |
| IN | 187CHE2008 A | 8/2009 |
| JP | 9058093 | 3/1997 |
| JP | 2002-314552 | 10/2002 |
| JP | 2008-278179 | 11/2008 |
| JP | 2009/543279 | 12/2009 |
| JP | 2010-065667 | 3/2010 |
| JP | 2011-50000 | 3/2011 |
| JP | 2011-211673 | 10/2011 |
| JP | 2012-049681 | 8/2012 |
| JP | 2004001195 A | 1/2014 |
| KR | 10/2002-0066925 | 8/2002 |
| KR | 100451374 | 9/2004 |
| KR | 10-2012-0068597 | 6/2012 |
| KR | 10-2012-0082106 | 7/2012 |
| KR | 10-2014-0082367 | 11/2015 |
| WO | 2001/008366 | 2/2001 |
| WO | 2003/043788 A1 | 5/2003 |
| WO | 2008/001274 | 1/2008 |
| WO | 2008/017597 | 2/2008 |
| WO | 2008/114777 | 9/2008 |
| WO | 2013/052886 | 4/2013 |

OTHER PUBLICATIONS

Non-Final Office Action issued in U.S. Appl. No. 13/646,397 dated Oct. 8, 2015, 16 pages.
Notice of Allowance issued in U.S. Appl. No. 13/646,397 dated Mar. 7, 2016, 14 pages.
U.S. Appl. No. 13/646,382 entitled "Methods for Discovery, Configuration, and Coordinating Data Communications Between Masters and Slave Devices in a Communication System" filed Oct. 5, 2012, 122 pages.
Non-Final Office Action in U.S. Appl. No. 13/646,382 dated Jul. 2, 2014, 11 pages.
Notice of Allowance in U.S. Appl. No. 13/646,382 dated Nov. 26, 2014, 5 pages.
PCT Application Serial No. PCT/U52012/059084 filed Oct. 5, 2012.
Office Action in EP12779236.4 dated Jun. 2, 2014, 2 pages.
International Search Report in PCT/US2012/059084 dated Oct. 4, 2013, 5 pages.
Extended Search Report for European Patent Application Serial No. 15197323.7 dated Jun. 6, 2016.
1st Office Action issued in Chinese Patent Application Serial No. 20128005576.7 dated Dec. 3, 2015, 22 pages.
Office Action in Japan Patent Application Serial No. 2014-534801 dated Jan. 23, 2015, 4 pages.
English Translation of Japan Patent Application Serial No. 2014-534801 dated Jan. 23, 2015, 5 pages.
Office Action in Japan Patent Application Serial No. 2014-534801 dated Jul. 7, 2015, 5 pages.
English Translation of Japan Patent Application Serial No. 2014-534801 dated Jul. 7, 2015, 7 pages.
Notice of Allowance in JP Patent Application Serial No. 2014-534801 dated Nov. 11, 2015, 3 pages.
Office Action issued in JP-DIV Patent Application Serial No. 2015-162593 dated Oct. 4, 2016, 2 pages.

(56) References Cited

OTHER PUBLICATIONS

OA1 (NFOA) issued in U.S. Appl. No. 14/884,900 dated Aug. 21, 2017, 22 pages.
OA1 (NFOA) issued in U.S. Appl. No. 14/844,987 dated Aug. 4, 2017, 17 pages.

* cited by examiner

DISTRIBUTED AUDIO COORDINATION OVER A TWO-WIRE COMMUNICATION BUS

CROSS-REFERENCE TO RELATED APPLICATIONS

This application claims priority to U.S. patent application Ser. No. 14/063,886, entitled "Two-Wire Communication Protocol Engine" and filed Oct. 25, 2013, which claims priority to U.S. Provisional Application Ser. No. 61/843,891, entitled "A2B Protocol Engine" and filed Jul. 8, 2013; U.S. Provisional Application Ser. No. 61/843,896, entitled "Digital Phase Detector" and filed Jul. 8, 2013; U.S. Provisional Application Ser. No. 61/843,902, entitled "Differential Decoder" and filed Jul. 8, 2013; U.S. Provisional Application Ser. No. 61/845,542, entitled "System and Method for Implementing A2B Protocol" and filed Jul. 12, 2013; U.S. patent application Ser. No. 13/646,397, entitled "Two-Wire Communication System for High-Speed Data and Power Distribution" and filed Oct. 5, 2012; U.S. patent application Ser. No. 13/646,382 (now U.S. Pat. No. 8,990,464), entitled "Methods for Discovery, Configuration, and Coordinating Data Communications Between Master and Slave Devices in a Communication System" and filed Oct. 5, 2012; U.S. Provisional Application No. 61/543,379, entitled "Two-Wire Communication System for High-Speed Data and Power Distribution" and filed Oct. 5, 2011; and U.S. Provisional Application No. 61/543,380, entitled "Two-Wire Communication System for High-Speed Data and Power Distribution" and filed Oct. 5, 2011. This application also claims priority to U.S. Provisional Application No. 62/065,724, entitled "Applications of a Low-Latency Two-Wire Communication System" and filed Oct. 19, 2014; U.S. Provisional Application No. 62/065,736, entitled "Applications of a Low-Latency Two-Wire Communication System" and filed Oct. 19, 2014; and U.S. Provisional Application No. 62/065,738, entitled "Applications of a Low-Latency Two-Wire Communication System" and filed Oct. 19, 2014. The entireties of the disclosures of the prior applications are considered part of and are incorporated by reference in the present disclosure.

TECHNICAL FIELD

The present disclosure relates generally to communication systems and, more particularly, to peripheral device diagnostics and control over a two-wire communication bus.

BACKGROUND

As electronic components decrease in size, and as performance expectations increase, more components are included in previously un-instrumented or less-instrumented devices. In some settings, the communication infrastructure used to exchange signals between these components (e.g., in a vehicle) has required thick and heavy bundles of cables.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
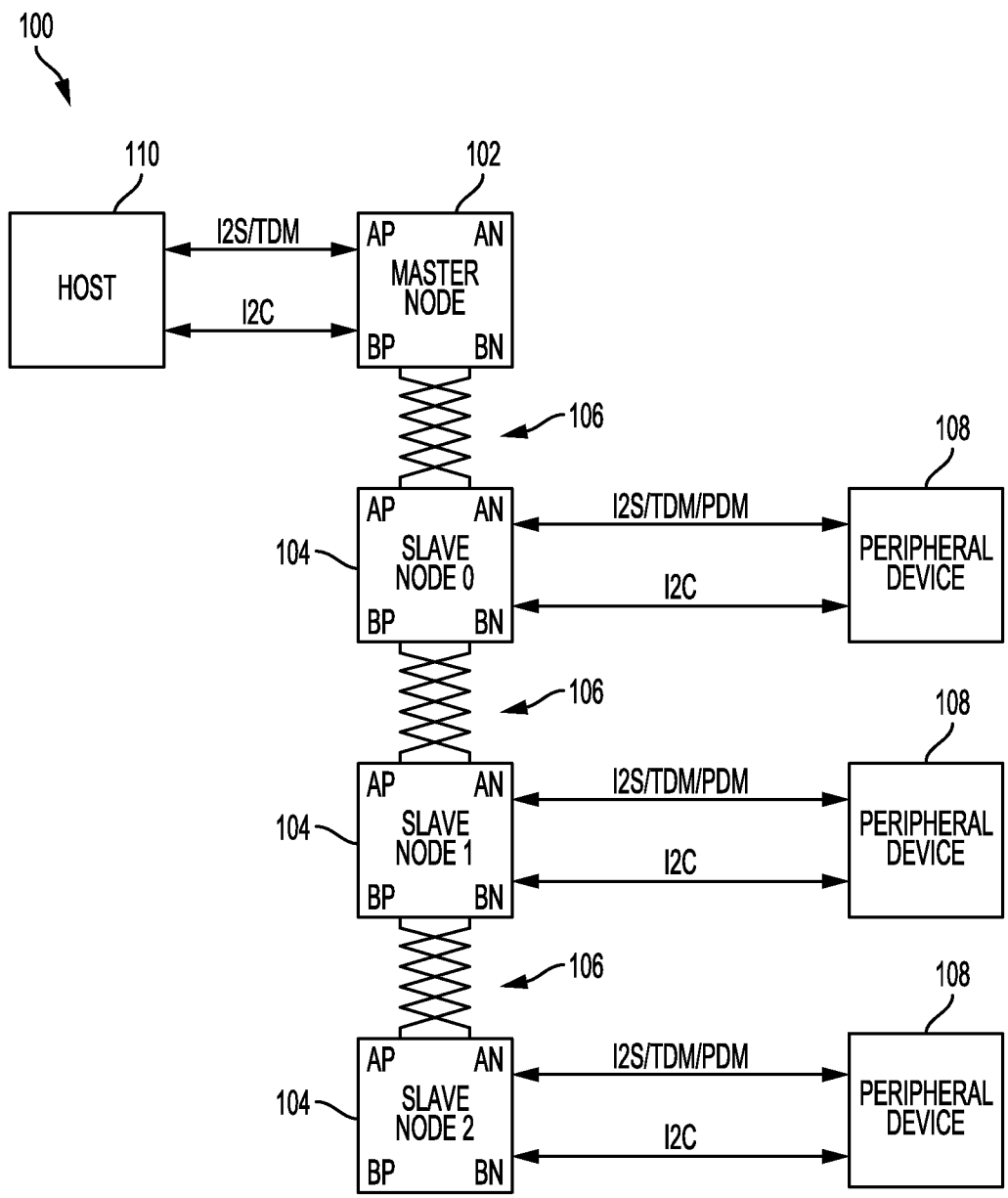
FIG. 1 is a block diagram of an illustrative two-wire communication system, in accordance with various embodiments.

Disclosed herein are systems and techniques for distributed audio coordination over a two-wire communication bus. Various embodiments of the systems and techniques may enable low latency parameter communication and control of peripheral devices (e.g., audio devices) coupled to the slave nodes daisy-chained along a two-wire bus.

As noted above, as electronic components decrease in size, and as performance expectations increase, more components are included in previously un-instrumented or less-instrumented devices. This drive toward increased instrumentation has conventionally been limited by the communication infrastructure used to exchange signals between components. For example, the proliferation of sensors, such as microphones, cameras, etc., in automobiles (and other closed and/or mobile systems, such as robotic systems) has led to excessive amounts of wiring between components. This excessive wiring is attended by an increase in system complexity and weight, and a decrease in performance and reliability.

Described herein are communications systems that provide low latency, time division multiplexed (TDM) communications over a two-wire bus (e.g., a twisted wire pair). In these systems, bi-directional synchronous data (e.g., digital audio), clock, and synchronization signals may be provided by the two-wire bus, supporting direct point-to-point connections between nodes on the bus and allowing multiple, daisy chained nodes at different locations to contribute or consume TDM channel content. These communication systems enable downstream traffic (e.g., from a master node to a last slave node), upstream traffic (e.g., to a master node from a slave node), and power transmission over the same two-wire bus.

In some embodiments of the distributed audio coordination systems and techniques disclosed herein, a two-wire bus may not only support master-to-slave communications (which may be particularly well-suited for applications controlled by the master node or a host), but may also support a "self-aware," node-to-node generic link within the two-wire bus that may offer an alternative to host- or master-based synchronization of independent audio channel processing. For example, in some embodiments, a slave node may use the two-wire bus to transmit compressor gain or other dynamics processor (DP) information directly between slave nodes to avoid audio imaging imbalances.

Some of the embodiments disclosed herein may include managing the power of audio devices coupled to the slave nodes on a two-wire bus. In some such embodiments, a slave node may use information transmitted to it via the two-wire bus to configure the maximum power for a peripheral device (e.g., an audio device) coupled to the slave node. For example, if a host (located at, e.g., the head unit of a vehicle) knows about the maximum volume (set by the user or fixed by a volume controller), this information can be transmitted to the slave nodes and used by the slave nodes to signal a power management section (e.g., an amplification section) of the slave node on associated peripheral to only provide limited power (either through the limiting of voltage or current).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Various components may be referred to or illustrated herein in the singular (e.g., a "processor," a "peripheral device," etc.), but this is simply for ease of discussion, and any element referred to in the singular may include multiple such elements in accordance with the teachings herein.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an application-specific integrated circuit (ASIC), an electronic circuit, and optical circuit, a processor (shared, dedicated, or group), and/or memory (shared, dedicated, or group) that execute one or more software or firmware programs, a combinational logic circuit, and/or other suitable hardware that provide the described functionality. A master node may also be referred to as a master "device" herein; similarly, a slave node may be referred to as a slave "device" herein. As used herein, a "microphone" may include a microphone array.

Any of the embodiments described herein may be performed in accordance with any suitable related embodiments disclosed in any of the prior patent filings to which the present application claims priority. In particular, any of the embodiments of the Automotive Audio Bus (A2B) system disclosed in any of the priority filings may be implemented in any combination with the embodiments described herein. For example, power switching and diagnostics may be included in the two-wire communication systems described herein, as discussed in U.S. Provisional Application No. 61/845,542, filed Jul. 12, 2013. In another example, decoders may be included in the two-wire communication systems described herein, as discussed in U.S. Provisional Application No. 61/843,902, filed Jul. 8, 2013. In another example, digital phase detectors may be included in the two-wire communication systems described herein, as discussed in U.S. Provisional Application No. 61/843,896, filed Jul. 8, 2013. In another example, the two-wire communication systems described herein may include the state machine functionality discussed in U.S. Provisional Application No. 61/843,891, filed Jul. 8, 2013.

FIG. 1 is a block diagram of an illustrative half-duplex two-wire communication system 100, in accordance with various embodiments. The system 100 includes a host 110, a master node 102 and at least one slave node 104. In FIG. 1, three slave nodes (0, 1, and 2) are illustrated. The depiction of three slave nodes 104 in FIG. 1 is simply illustrative, and the system 100 may include one, two, or more slave nodes 104, as desired.

The master node 102 may communicate with the slave nodes 104 over a two-wire bus 106. The bus 106 may include different two-wire bus links between adjacent nodes along the bus 106 to connect the nodes along the bus 106 in a daisy-chain fashion. For example, as illustrated in FIG. 1, the bus 106 may include a link coupling the master node 102 to the slave node 0, a link coupling the slave node 0 to the slave node 1, and a link coupling the slave node 1 to the slave node 2. The links of the bus 106 may each be formed of a single twisted wire pair (e.g., an unshielded twisted pair).

The host 110 may include a processor that programs the master node 102, and acts as the originator and recipient of various payloads transmitted along the bus 106. In particular, the host 110 may be the master of Inter-Integrated Circuit Sound (I2S) communications that happen along the bus 106. The host 110 may communicate with the master node 102 via an I2S/Time Division Multiplex (TDM) bus and/or an Inter-Integrated Circuit (I2C) bus. In some embodiments, the master node 102 may be a transceiver (e.g., the node transceiver 120 discussed below with reference to FIG. 2) located within a housing of the host 110. The master node 102 may be programmable by the host 110 over the I2C bus for configuration and read-back, and may be configured to generate clock, synchronization, and framing for all of the slave nodes 104. In some embodiments, an extension of the I2C control bus between the host 110 in the master node 102 may be embedded in the data streams transmitted over the bus 106, allowing the host 110 direct access to registers and status information for the one or more slave nodes 104, as well as enabling I2C-to-I2C communication over distance to allow the host 110 to control the peripherals 108.

The master node 102 may generate "downstream" signals (e.g., data signals, power signals, etc., transmitted away from the master node 102 along the bus 106) and receive "upstream" signals (e.g., transmitted toward the master node 102 along the bus 106). The master node 102 may provide a clock signal for synchronous data transmission over the bus 106. As used herein, "synchronous data" may include data streamed continuously (e.g., audio signals) with a fixed time interval between two successive transmissions to/from the same node along the bus 106. In some embodiments, the clock signal provided by the master node 102 may be derived from an I2S input provided to the master node 102 by the host 110. A slave node 104 may be an addressable network connection point that represents a possible destination for data frames transmitted downstream on the bus 106 or upstream on the bus 106. A slave node 104 may also represent a possible source of downstream or upstream data frames. The system 100 may allow for control information and other data to be transmitted in both directions over the bus 106 from one node to the next. One or more of the slave nodes 104 may also be powered by signals transmitted over the bus 106.

In particular, each of the master node 102 and the slave nodes 104 may include a positive upstream terminal (denoted as "AP"), a negative upstream terminal (denoted as "AN"), a positive downstream terminal (denoted as "BP"), and a negative downstream terminal (denoted as "BN"). The positive and negative downstream terminals of a node may be coupled to the positive and negative upstream terminals of the adjacent downstream node, respectively. As shown in FIG. 1, the master node 102 may include positive and negative upstream terminals, but these terminals may not be used; in other embodiments, the master node 102 may not include positive and negative upstream terminals. The last slave node 104 along the bus 106 (the slave node 2 in FIG. 1) may include positive and negative downstream terminals, but these terminals may not be used; in other embodiments, the last slave node 104 along the bus may not include positive and negative downstream terminals.

As discussed in detail below, the master node 102 may periodically send a synchronization control frame downstream, optionally along with data intended for one or more of the slave nodes 104. For example, the master node 102 may transmit a synchronization control frame every 1024 bits (representing a superframe) at a frequency of 48 kHz, resulting in an effective bit rate on the bus 106 of 49.152 Mbps. Other rates may be supported, including, for example, 44.1 kHz. The synchronization control frame may allow the slave nodes 104 to identify the beginning of each superframe and also, in combination with physical layer encoding/signaling, may allow each slave node 104 to derive its internal operational clock from the bus 106. The synchronization control frame may include a preamble for signaling the start of synchronization, as well as control fields that allow for various addressing modes (e.g., normal, broadcast, discovery), configuration information (e.g., writing to registers of the slave nodes 104), conveyance of I2C information, remote control of certain general-purpose input/output (GPIO) pins at the slave nodes 104, and other services. A portion of the synchronization control frame following the preamble and the payload data may be scrambled in order to reduce the likelihood that information in the synchronization control frame will be mistaken for a new preamble, and to flatten the spectrum of related electromagnetic emissions.

The synchronization control frame may get passed between slave node 104 (optionally along with other data, which may come from the master node 102 but additionally or alternatively may come from one or more upstream slave nodes 104 or from a slave node 104 itself) until it reaches the last slave node 104 (i.e., the slave node 2 in FIG. 1), which has been configured by the master node 102 as the last slave node 104 or has self-identified itself as the last slave node 104. Upon receiving the synchronization control frame, the last slave node 104 may transmit a synchronization response frame followed by any data that it is permitted to transmit (e.g., a 24-bit audio sample in a designated time slot). The synchronization response frame may be passed upstream between slave nodes 104 (optionally along with data from downstream slave nodes 104), and based on the synchronization response frame, each slave node 104 may be able to identify a time slot, if any, in which the slave node 104 is permitted to transmit.

In some embodiments, one or more of the slave nodes 104 in the system 100 may be coupled to and communicate with a peripheral device 108. For example, a slave node 104 may be configured to read data from and/or write data to the associated peripheral device 108 using I2S, pulse density modulation (PDM), TDM, and/or I2C protocols, as discussed below. Although the "peripheral device 108" may be referred to in the singular herein, this is simply for ease of discussion, and a single slave node 104 may be coupled with zero, one, or more peripheral devices. Examples of peripheral devices that may be included in the peripheral device 108 may include a digital signal processor (DSP), a field programmable gate array (FPGA), an application-specific integrated circuit (ASIC), an analog to digital converter (ADC), a digital to analog converter (DAC), a codec, a microphone, a microphone array, a speaker, an audio amplifier, a protocol analyzer, an accelerometer or other motion sensor, an environmental condition sensor (e.g., a temperature, humidity, and/or gas sensor), a wired or wireless communication transceiver, a display device (e.g., a touchscreen display), a user interface component (e.g., a button, a dial, or other control), a camera (e.g., a video camera), a memory device, or any other suitable device that transmits and/or receives data. A number of examples of different peripheral device configurations are discussed in detail herein.

In some embodiments, the peripheral device 108 may include any device configured for Inter-Integrated Circuit Sound (I2S) communication; the peripheral device 108 may communicate with the associated slave node 104 via the I2S protocol. In some embodiments, the peripheral device 108 may include any device configured for Inter-Integrated Circuit (I2C) communication; the peripheral device 108 may communicate with the associated slave node 104 via the I2C protocol. In some embodiments, a slave node 104 may not be coupled to any peripheral device 108.

A slave node 104 and its associated peripheral device 108 may be contained in separate housings and coupled through a wired or wireless communication connection or may be contained in a common housing. For example, a speaker connected as a peripheral device 108 may be packaged with the hardware for an associated slave node 104 (e.g., the node transceiver 120 discussed below with reference to FIG. 2), such that the hardware for the associated slave node 104 is contained within a housing that includes other speaker components. The same may be true for any type of peripheral device 108.

As discussed above, the host 110 may communicate with and control the master node 102 using multi-channel I2S and I2C communication protocols. In particular, the host 110 may transmit data via I2S to a frame buffer (not illustrated) in the master node 102, and the master node 102 may read data from the frame buffer and transmit the data along the bus 106. Analogously, the master node 102 may store data received via the bus 106 in the frame buffer, and then may transmit the data to the host 110 via I2S.

Each slave node 104 may have internal control registers that may be configured by communications from the master node 102. A number of such registers are discussed in detail below. Each slave node 104 may receive downstream data and may retransmit the data further downstream. Each slave node 104 may receive and/or generate upstream data and/or retransmit data upstream and/or add data to and upstream transaction.

Communications along the bus 106 may occur in periodic superframes. Each superframe may begin with a downstream synchronization control frame; be divided into periods of downstream transmission (also called "downstream portions"), upstream transmission (also called "upstream portions"), and no transmission (where the bus 106 is not driven); and end just prior to transmission of another downstream synchronization control frame. The master node 102 may be programmed (by the host 110) with a number of downstream portions to transmit to one or more of the slave nodes 104 and a number of upstream portions to receive from one or more of the slave nodes 104. Each slave node 104 may be programmed (by the master node 102) with a number of downstream portions to retransmit down the bus 106, a number of downstream portions to consume, a number of upstream portions to retransmit up the bus 106, and a number of upstream portions in which the slave node 104 may transmit data received from the slave node 104 from the associated peripheral device 108. Communication along the bus 106 is discussed in further detail below with reference to FIGS. 2-12.

Figure 2:
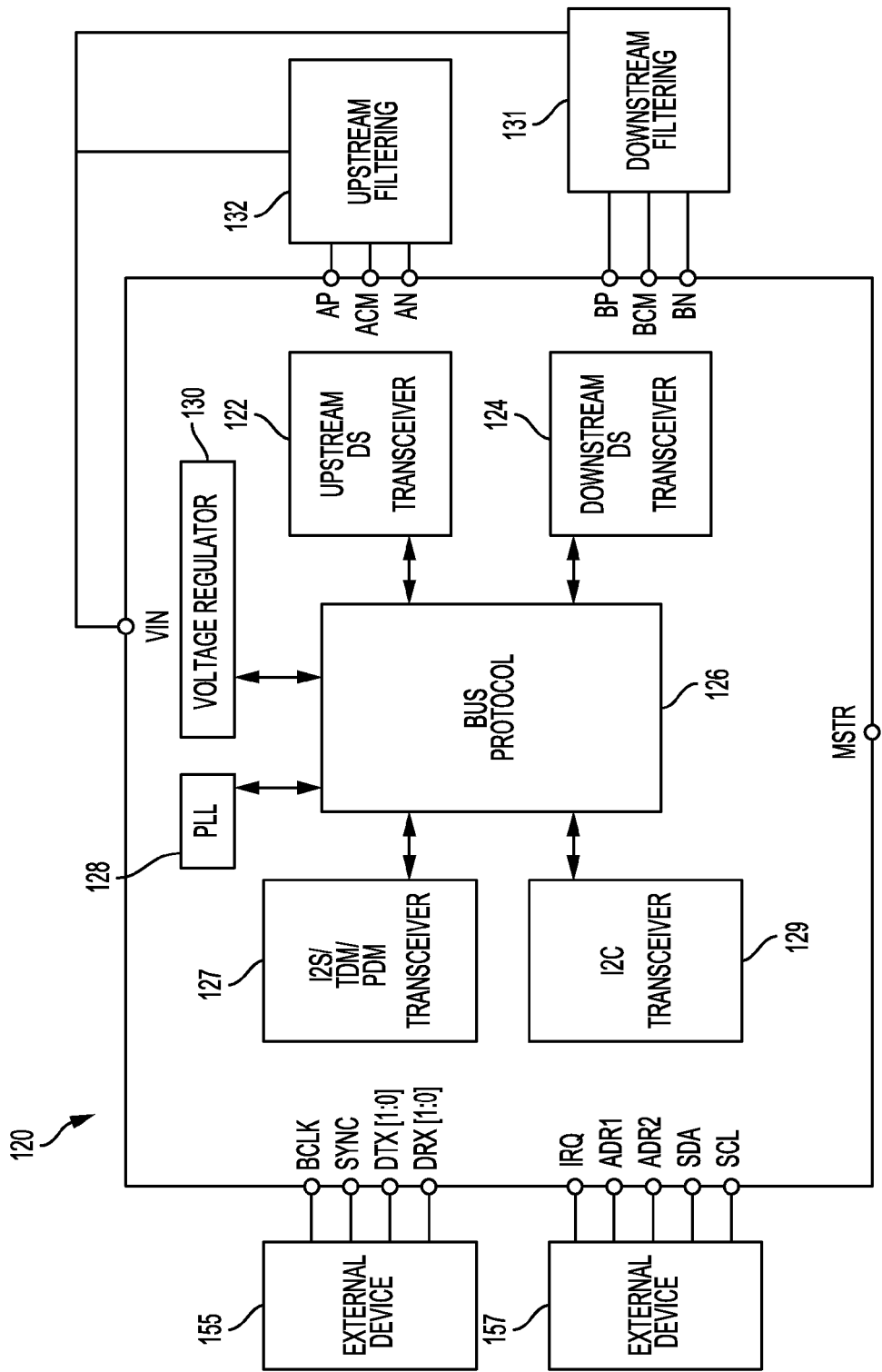
FIG. 2 is a block diagram of a node transceiver that may be included in a node of the system of FIG. 1, in accordance with various embodiments.

Each of the master node 102 and the slave nodes 104 may include a transceiver to manage communication between components of the system 100. FIG. 2 is a block diagram of a node transceiver 120 that may be included in a node (e.g., the master node 102 or a slave node 104) of the system 100 of FIG. 1, in accordance with various embodiments. In some embodiments, a node transceiver 120 may be included in each of the nodes of the system 100, and a control signal may be provided to the node transceiver 120 via a master (MSTR) pin to indicate whether the node transceiver 120 is to act as a master (e.g., when the MSTR pin is high) or a slave (e.g., when the MSTR pin is low).

The node transceiver 120 may include an upstream differential signaling (DS) transceiver 122 and a downstream DS transceiver 124. The upstream DS transceiver 122 may be coupled to the positive and negative upstream terminals discussed above with reference to FIG. 1, and the downstream DS transceiver 124 may be coupled to the positive and negative downstream terminals discussed above with reference to FIG. 1. In some embodiments, the upstream DS transceiver 122 may be a low voltage DS (LVDS) transceiver, and the downstream DS transceiver 124 may be an LVDS transceiver. Each node in the system 100 may be AC-coupled to the bus 106, and data signals may be conveyed along the bus 106 (e.g., via the upstream DS transceiver 122 and/or the downstream DS transceiver 124) using a predetermined form of DS (e.g., LVDS or Multipoint LVDS (MLVDS) or similar signaling) with appropriate encoding to provide timing information over the bus 106 (e.g., differential Manchester coding, biphase mark coding, Manchester coding, Non-Return-to-Zero, Inverted (NRZI) coding with run-length limiting, or any other suitable encoding).

The upstream DS transceiver 122 and the downstream DS transceiver 124 may communicate with bus protocol circuitry 126, and the bus protocol circuitry 126 may communicate with a phased locked loop (PLL) 128 and voltage regulator circuitry 130, among other components. When the node transceiver 120 is powered up, the voltage regulator circuitry 130 may raise a "power good" signal that is used by the PLL 128 as a power-on reset.

As noted above, one or more of the slave nodes 104 in the system 100 may receive power transmitted over the bus 106 concurrently with data. For power distribution (which is optional, as some of the slave nodes 104 may be configured to have exclusively local power provided to them), the master node 102 may place a DC bias on the bus link between the master node 102 and the slave node 0 (e.g., by connecting one of the downstream terminals to a voltage source provided by a voltage regulator and the other downstream terminal to ground). The DC bias may be a predetermined voltage, such as 5 V, 8 V, the voltage of a car battery, or a higher voltage. Each successive slave node 104 can selectively tap its upstream bus link to recover power (e.g., using the voltage regulator circuitry 130). This power may be used to power the slave node 104 itself (and optionally one or more peripheral device 108 coupled to the slave node 104). A slave node 104 may also selectively bias the bus link downstream for the next-in-line slave node 104 with either the recovered power from the upstream bus link or from a local power supply. For example, the slave node 0 may use the DC bias on the upstream bus link 106 to recover power for the slave node 0 itself and/or for one or more associated peripheral device 108, and/or the slave node 0 may recover power from its upstream bus link 106 to bias its downstream bus link 106.

Thus, in some embodiments, each node in the system 100 may provide power to the following downstream node over a downstream bus link. The powering of nodes may be performed in a sequenced manner. For example, after discovering and configuring the slave node 0 via the bus 106, the master node 102 may instruct the slave node 0 to provide power to its downstream bus link 106 in order to provide power to the slave node 1; after the slave node 1 is discovered and configured, the master node 102 may instruct the slave node 1 to provide power to its downstream bus link 106 in order to provide power to the slave node 2 (and so on for additional slave nodes 104 coupled to the bus 106. In some embodiments, one or more of the slave nodes 104 may be locally powered, instead of or in addition to being powered from its upstream bus link. In some such embodiments, the local power source for a given slave node 104 may be used to provide power to one or more downstream slave nodes.

In some embodiments, upstream filtering circuitry 132 may be disposed between the upstream DS transceiver 122 and the voltage regulator circuitry 130, and downstream filtering circuitry 131 may be disposed between the downstream DS transceiver 124 and the voltage regulator circuitry 130. Since each link of the bus 106 may carry AC (signal) and DC (power) components, the upstream filtering circuitry 132 and the downstream filtering circuitry 131 may separate the AC and DC components, providing the AC components to the upstream DS transceiver 122 and the downstream DS transceiver 124, and providing the DC components to the voltage regulator 130. AC couplings on the line side of the upstream DS transceiver 122 and downstream DS transceiver 124 substantially isolate the transceivers 122 and 124 from the DC component on the line to allow for high-speed bi-directional communications. As discussed above, the DC component may be tapped for power, and the upstream filtering circuitry 132 and the downstream filtering circuitry 131 may include a ferrite, a common mode choke, or an inductor, for example, to reduce the AC component provided to the voltage regulator circuitry 130. In some embodiments, the upstream filtering circuitry 132 may be included in the upstream DS transceiver 122, and/or the downstream filtering circuitry 131 may be included in the downstream DS transceiver 124; in other embodiments, the filtering circuitry may be external to the transceivers 122 and 124.

The node transceiver 120 may include a transceiver 127 for I2S, TDM, and PDM communication between the node transceiver 120 and an external device 155. Although the "external device 155" may be referred to in the singular herein, this is simply for ease of illustration, and multiple external devices may communicate with the node transceiver 120 via the I2S/TDM/PDM transceiver 127. As known in the art, the I2S protocol is for carrying pulse code modulated (PCM) information (e.g., between audio chips on a printed circuit board). As used herein, "I2S/TDM" may refer to an extension of the I2S stereo (2-channel) content to multiple channels using TDM. As known in the art, PDM may be used in sigma delta converters, and in particular, PDM format may represent an over-sampled 1-bit sigma delta ADC signal before decimation. PDM format is often used as the output format for digital microphones. The I2S/TDM/PDM transceiver 127 may be in communication with the bus protocol circuitry 126 and pins for communication with the external device 155. Six pins, BCLK, SYNC, DTX[1:0], and DRX[1:0], are illustrated in FIG. 2; the BCLK pin may be used for an I2S bit clock, the SYNC pin may be used for an I2S frame synchronization signal, and the DTX[1:0] and DRX[1:0] pins are used for transmit and receive data channels, respectively. Although two transmit pins (DTX[1:0]) and two receive pins (DRX[1:0]) are illustrated in FIG. 2, any desired number of receive and/or transmit pins may be used.

When the node transceiver 120 is included in the master node 102, the external device 155 may include the host 110, and the I2S/TDM/PDM transceiver 127 may provide an I2S slave (in regards to BCLK and SYNC) that can receive data from the host 110 and send data to the host 110 synchronously with an I2S interface clock of the host 110. In particular, an I2S frame synchronization signal may be received at the SYNC pin as an input from the host 110, and the PLL 128 may use that signal to generate clocks. When the node transceiver 120 is included in a slave node 104, the external device 155 may include one or more peripheral devices 108, and the I2S/TDM/PDM transceiver 127 may provide an I2S clock master (for BCLK and SYNC) that can control I2S communication with the peripheral device 108. In particular, the I2S/TDM/PDM transceiver 127 may provide an I2S frame synchronization signal at the SYNC pin as an output. Registers in the node transceiver 120 may determine which and how many I2S/TDM channels are being transmitted as data slots over the bus 106. A TDM mode (TDMMODE) register in the node transceiver 120 may store a value of how many TDM channels fit between consecutive SYNC pulses on a TDM transmit or receive pin. Together with knowledge of the channel size, the node transceiver 120 may automatically set the BCLK rate to match the amount of bits within the sampling time (e.g., 48 kHz).

The node transceiver 120 may include a transceiver 129 for I2C communication between the node transceiver 120 and an external device 157. Although the "external device 157" may be referred to in the singular herein, this is simply for ease of illustration, and multiple external devices may communicate with the node transceiver 120 via the I2C transceiver 129. As known in the art, the I2C protocol uses clock (SCL) and data (SDA) lines to provide data transfer. The I2C transceiver 129 may be in communication with the bus protocol circuitry 126 and pins for communication with the external device 157. Four pins, ADR1, ADR2, SDA, and SCL are illustrated in FIG. 2; ADR1 and ADR2 may be used to modify the I2C addresses used by the node transceiver 120 when the node transceiver 120 acts as an I2C slave (e.g., when it is included in the master node 102), and SDA and SCL are used for the I2C serial data and serial clock signals, respectively. When the node transceiver 120 is included in the master node 102, the external device 157 may include the host 110, and the I2C transceiver 129 may provide an I2C slave that can receive programming instructions from the host 110. In particular, an I2C serial clock signal may be received at the SCL pin as an input from the host 110 for register accesses. When the node transceiver 120 is included in a slave node 104, the external device 157 may include a peripheral device 108 and the I2C transceiver 129 may provide an I2C master to allow the I2C transceiver to program one or more peripheral devices in accordance with instructions provided by the host 110 and transmitted to the node transceiver 120 via the bus 106. In particular, the I2C transceiver 129 may provide the I2C serial clock signal at the SCL pin as an output.

The node transceiver 120 may include an interrupt request (IRQ) pin in communication with the bus protocol circuitry 126. When the node transceiver 120 is included in the master node 102 via the I2C transceiver 129, the bus protocol circuitry 126 may provide event-driven interrupt requests toward the host 110 via the IRQ pin. When the node transceiver 120 is included in a slave node 104 (e.g., when the MSTR pin is low), the IRQ pin may serve as a GPIO pin with interrupt request capability.

The system 100 may operate in any of a number of different operational modes. The nodes on the bus 106 may each have a register indicating which operational mode is currently enabled. Descriptions follow of examples of various operational modes that may be implemented. In a standby operational mode, bus activity is reduced to enable global power savings; the only traffic required is a minimal downstream preamble to keep the PLLs of each node (e.g., the PLL 128) synchronized. In standby operational mode, reads and writes across the bus 106 are not supported. In a discovery operational mode, the master node 102 may send predetermined signals out along the bus 106 and wait for suitable responses to map out the topology of slave nodes 104 distributed along the bus 106. In a normal operational mode, full register access may be available to and from the slave nodes 104 as well as access to and from peripheral devices 108 over the bus 106. Normal mode may be globally configured by the host 110 with or without synchronous upstream data and with or without synchronous downstream data.

Figure 3:
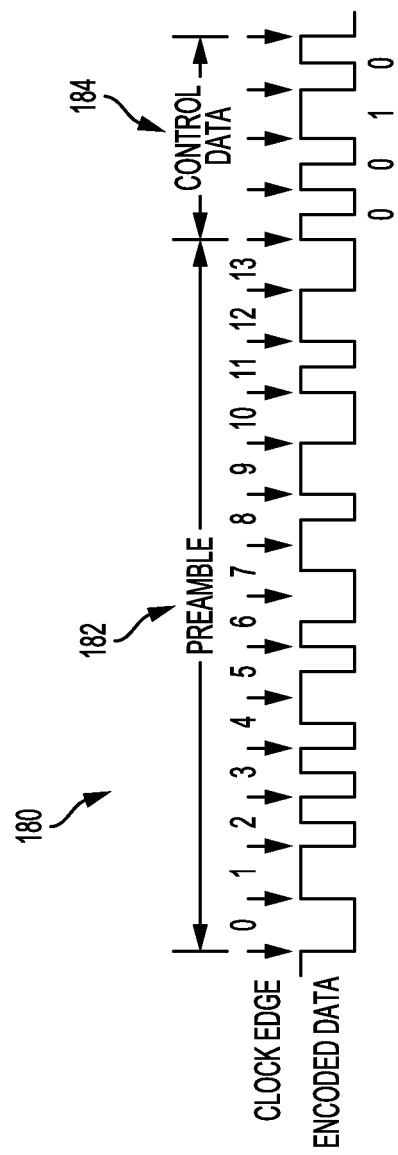
FIG. 3 is a diagram of a portion of a synchronization control frame used for communication in the system of FIG. 1, in accordance with various embodiments.

FIG. 3 is a diagram of a portion of a synchronization control frame 180 used for communication in the system 100, in accordance with various embodiments. In particular, the synchronization control frame 180 may be used for data clock recovery and PLL synchronization, as discussed below. As noted above, because communications over the bus 106 may occur in both directions, communications may be time-multiplexed into downstream portions and upstream portions. In a downstream portion, a synchronization control frame and downstream data may be transmitted from the master node 102, while in an upstream portion, a synchronization response frame, and upstream data may be transmitted to the master node 102 from each of the slave nodes 104. The synchronization control frame 180 may include a preamble 182 and control data 184. Each slave node 104 may be configured to use the preamble 182 of the received synchronization control frame 180 as a time base for feeding the PLL 128. To facilitate this, a preamble 182 does not follow the "rules" of valid control data 184, and thus can be readily distinguished from the control data 184.

Figure 5:
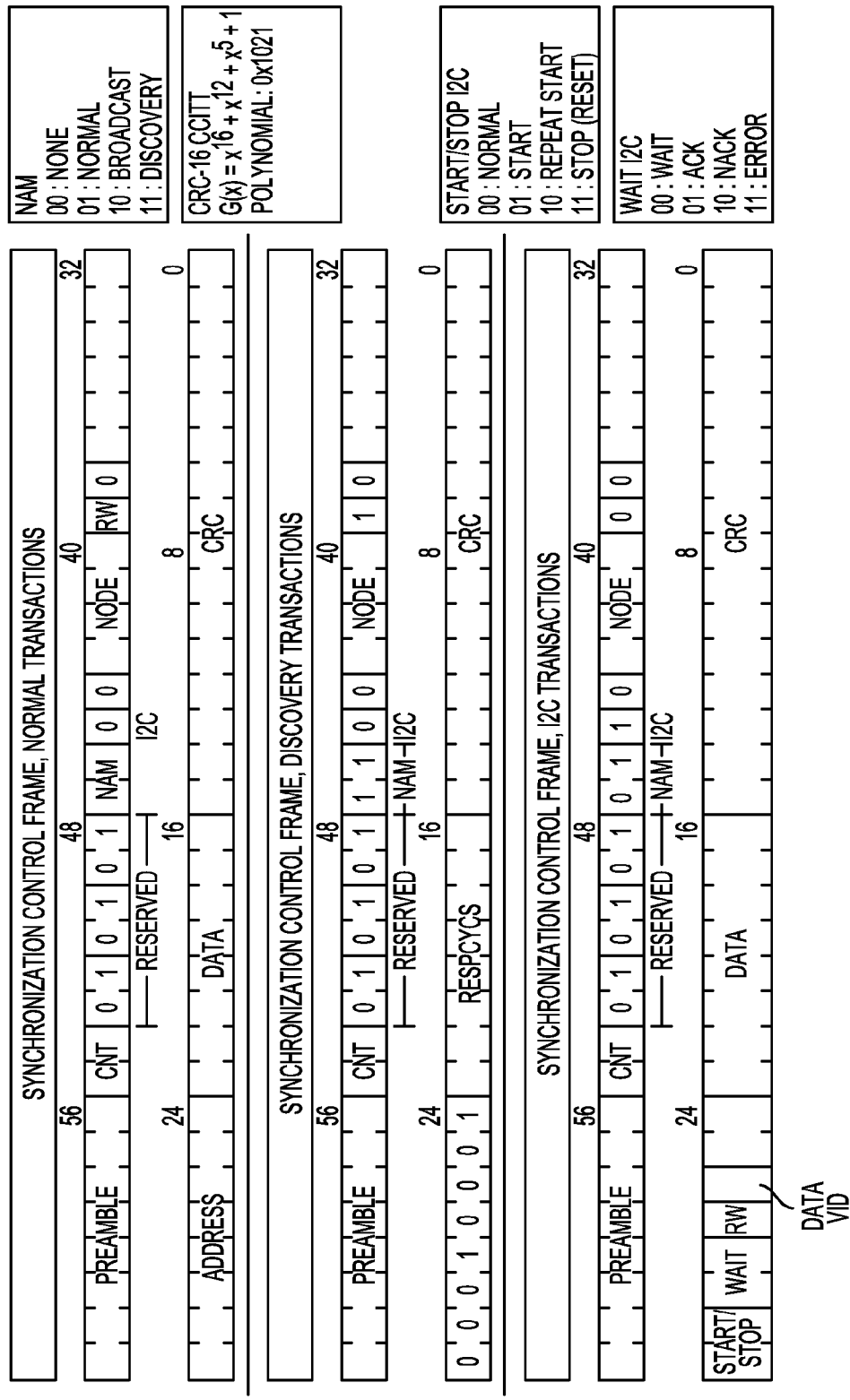
FIG. 5 illustrates example formats for a synchronization control frame in different modes of operation of the system of FIG. 1, in accordance with various embodiments.

For example, in some embodiments, communication along the bus 106 may be encoded using a clock first, transition on zero differential Manchester coding scheme. According to such an encoding scheme, each bit time begins with a clock transition. If the data value is zero, the encoded signal transitions again in the middle of the bit time. If the data value is one, the encoded signal does not transition again. The preamble 182 illustrated in FIG. 5 may violate the encoding protocol (e.g., by having clock transitions that do not occur at the beginning of bit times 5, 7, and 8), which means that the preamble 182 may not match any legal (e.g., correctly encoded) pattern for the control data 184. In addition, the preamble 182 cannot be reproduced by taking a legal pattern for the control data 184 and forcing the bus 106 high or low for a single bit time or for a multiple bit time period. The preamble 182 illustrated in FIG. 5 is simply illustrative, and the synchronization control frame 180 may include different preambles 182 that may violate the encoding used by the control data 184 in any suitable manner.

The bus protocol circuitry 126 may include differential Manchester decoder circuitry that runs on a clock recovered from the bus 106 and that detects the synchronization control frame 180 to send a frame sync indicator to the PLL 128. In this manner, the synchronization control frame 180 may be detected without using a system clock or a higher-speed oversampling clock. Consequently, the slave nodes 104 can receive a PLL synchronization signal from the bus 106 without requiring a crystal clock source at the slave nodes 104.

Figure 4:
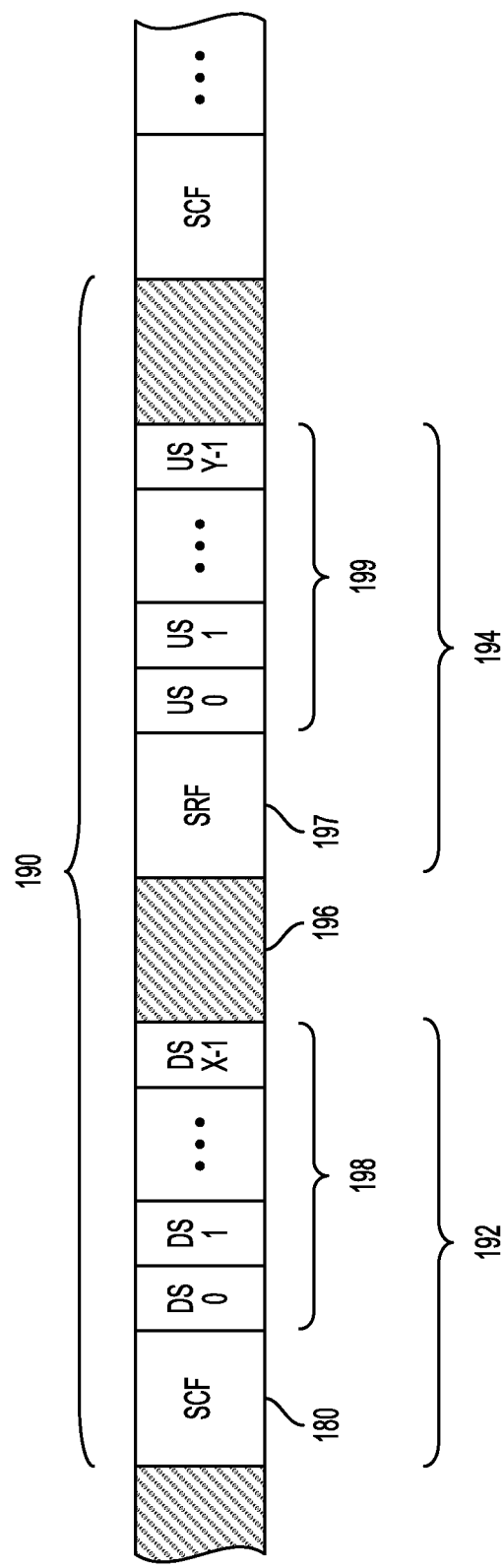
FIG. 4 is a diagram of a superframe used for communication in the system of FIG. 1, in accordance with various embodiments.

As noted above, communications along the bus 106 may occur in periodic superframes. FIG. 4 is a diagram of a superframe 190, in accordance with various embodiments.

Figure 6:
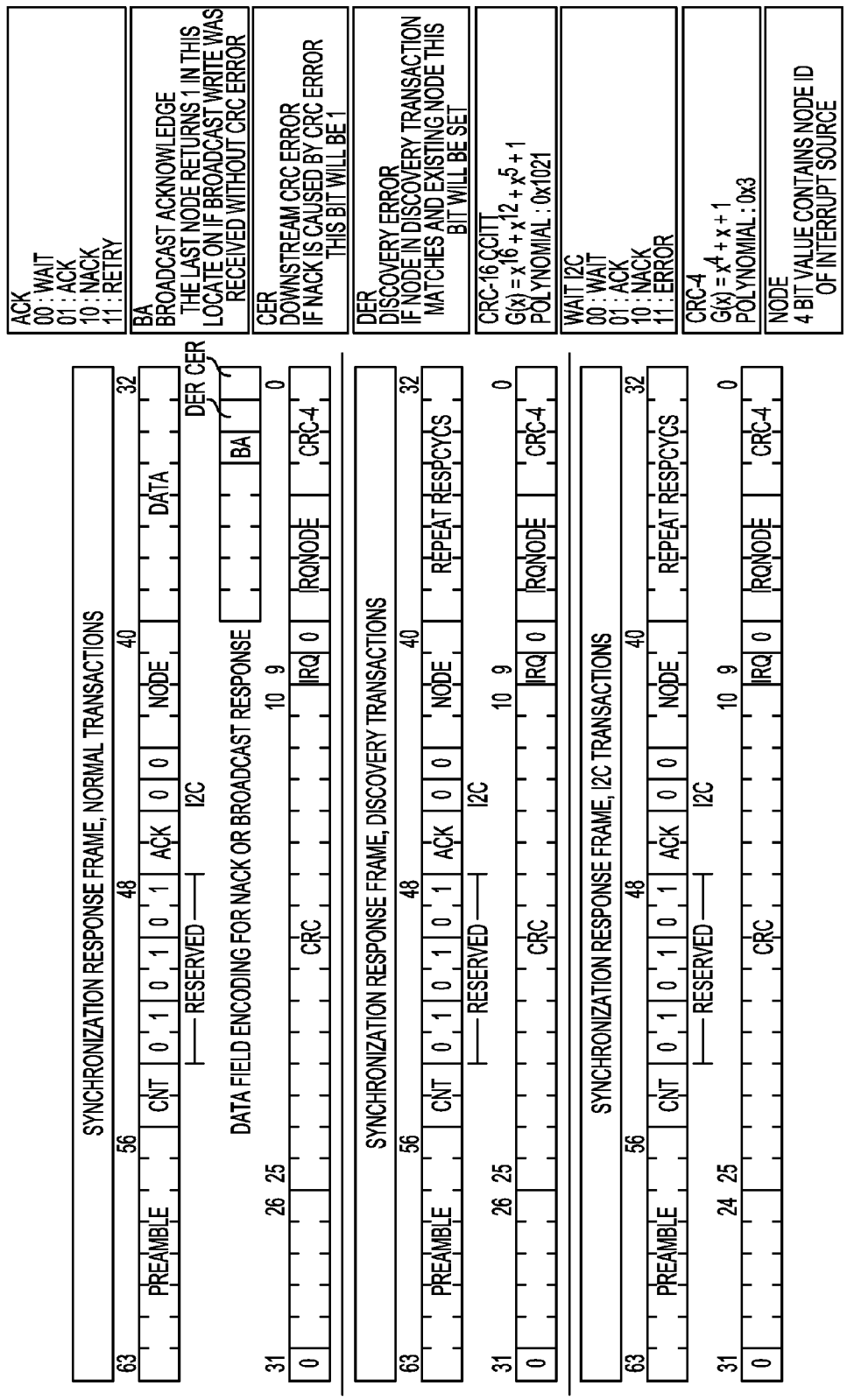
FIG. 6 illustrates example formats for a synchronization response frame at different modes of operation of the system of FIG. 1, in accordance with various embodiments.

As shown in FIG. 6, a superframe may begin with a synchronization control frame 180. When the synchronization control frame 180 is used as a timing source for the PLL 128, the frequency at which superframes are communicated ("the superframe frequency") may be the same as the synchronization signal frequency. In some embodiments in which audio data is transmitted along the bus 106, the superframe frequency may be the same as the audio sampling frequency used in the system 100 (e.g., either 48 kHz or 44.1 kHz), but any suitable superframe frequency may be used. Each superframe 190 may be divided into periods of downstream transmission 192, periods of upstream transmission 194, and periods of no transmission 196 (e.g., when the bus 106 is not driven).

In FIG. 4, the superframe 190 is shown with an initial period of downstream transmission 192 and a later period of upstream transmission 194. The period of downstream transmission 192 may include a synchronization control frame 180 and X downstream data slots 198, where X can be zero. Substantially all signals on the bus 106 may be line-coded and a synchronization signal forwarded downstream from the master node 102 to the last slave node 104 (e.g., the slave node 104C) in the form of the synchronization preamble 182 in the synchronization control frame 180, as discussed above. Downstream, TDM, synchronous data may be included in the X downstream data slots 198 after the synchronization control frame 180. The downstream data slots 198 may have equal width. As discussed above, the PLL 128 may provide the clock that a node uses to time communications over the bus 106. In some embodiments in which the bus 106 is used to transmit audio data, the PLL 128 may operate at a multiple of the audio sampling frequency (e.g., 1024 times the audio sampling frequency, resulting in 1024-bit clocks in each superframe).

The period of upstream transmission 194 may include a synchronization response frame 197 and Y upstream data slots 199, where Y can be zero. In some embodiments, each slave node 104 may consume a portion of the downstream data slots 198. The last slave node (e.g., slave node 2 in FIG. 1) may respond (after a predetermined response time stored in a register of the last slave node) with a synchronization response frame 197. Upstream, TDM, synchronous data may be added by each slave node 104 in the upstream data slots 199 directly after the synchronization response frame 197. The upstream data slots 199 may have equal width. A slave node 104 that is not the last slave node (e.g., the slave nodes 0 and 1 in FIG. 1) may replace the received synchronization response frame 197 with its own upstream response if a read of one of its registers was requested in the synchronization control frame 180 of the superframe 190 or if a remote I2C read was requested in the synchronization control frame 180 of the superframe 190.

As discussed above, the synchronization control frame 180 may begin each downstream transmission. In some embodiments, the synchronization control frame 180 may be 64 bits in length, but any other suitable length may be used. The synchronization control frame 180 may begin with the preamble 182, as noted above. In some embodiments, when the synchronization control frame 180 is retransmitted by a slave node 104 to a downstream slave node 104, the preamble 182 may be generated by the transmitting slave node 104, rather than being retransmitted.

The control data 184 of the synchronization control frame 180 may include fields that contain data used to control transactions over the bus 106. Examples of these fields are discussed below, and some embodiments are illustrated in FIG. 5. In particular, FIG. 5 illustrates example formats for the synchronization control frame 180 in normal mode, I2C mode, and discovery mode, in accordance with various embodiments. In some embodiments, a different preamble 182 or synchronization control frame 180 entirely may be used in standby mode so that the slave nodes 104 do not need to receive all of the synchronization control frame 180 until a transition to normal mode is sent.

In some embodiments, the synchronization control frame 180 may include a count (CNT) field. The CNT field may have any suitable length (e.g., 2 bits) and may be incremented (modulo the length of the field) from the value used in the previous superframe. A slave node 104 that receives a CNT value that is unexpected may be programmed to return an interrupt.

In some embodiments, the synchronization control frame 180 may include a node addressing mode (NAM) field. The NAM field may have any suitable length (e.g., 2 bits) and may be used to control access to registers of a slave node 104 over the bus 106. In normal mode, registers of a slave node 104 may be read from and/or written to based on the ID of the slave node 104 and the address of the register. Broadcast transactions are writes which should be taken by every slave node 104. In some embodiments, the NAM field may provide for four node addressing modes, including "none" (e.g., data not addressed to any particular slave node 104), "normal" (e.g., data unicast to a specific slave node 104 specified in the address field discussed below), "broadcast" (e.g., addressed to all slave nodes 104), and "discovery."

In some embodiments, the synchronization control frame 180 may include an I2C field. The I2C field may have any suitable length (e.g., 1 bit) and may be used to indicate that the period of downstream transmission 192 includes an I2C transaction. The I2C field may indicate that the host 110 has provided instructions to remotely access a peripheral device 108 that acts as an I2C slave with respect to an associated slave node 104.

In some embodiments, the synchronization control frame 180 may include a node field. The node field may have any suitable length (e.g., 4 bits) and may be used to indicate which slave node is being addressed for normal and I2C accesses. In discovery mode, this field may be used to program an identifier for a newly discovered slave node 104 in a node ID register of the slave node 104. Each slave node 104 in the system 100 may be assigned a unique ID when the slave node 104 is discovered by the master node 102, as discussed below. In some embodiments, the master node 102 does not have a node ID, while in other embodiments, the master node 102 may have a node ID. In some embodiments, the slave node 104 attached to the master node 102 on the bus 106 (e.g., the slave node 0 in FIG. 1) will be slave node 0, and each successive slave node 104 will have a number that is 1 higher than the previous slave node. However, this is simply illustrative, and any suitable slave node identification system may be used.

In some embodiments, the synchronization control frame 180 may include a read/write (RW) field. The RW field may have any suitable length (e.g., 1 bit) and may be used to control whether normal accesses are reads (e.g., RW=1) or writes (e.g., RW=0).

In some embodiments, the synchronization control frame 180 may include an address field. The address field may have any suitable length (e.g., 8 bits) and may be used to address specific registers of a slave node 104 through the bus 106. For I2C transactions, the address field may be replaced with I2C control values, such as START/STOP, WAIT, RW, and DATA VLD. For discovery transactions, the address field may have a predetermined value (e.g., as illustrated in FIG. 5).

In some embodiments, the synchronization control frame 180 may include a data field. The data field may have any suitable length (e.g., 8 bits) and may be used for normal, I2C, and broadcast writes. The RESPCYCS value, multiplied by 4, may be used to determine how many cycles a newly discovered node should allow to elapse between the start of the synchronization control frame 180 being received and the start of the synchronization response frame 197 being transmitted. When the NAM field indicates discovery mode, the node address and data fields discussed below may be encoded as a RESPCYCS value that, when multiplied by a suitable optional multiplier (e.g., 4), indicates the time, in bits, from the end of the synchronization control frame 180 to the start of the synchronization response frame 197. This allows a newly discovered slave node 104 to determine the appropriate time slot for upstream transmission.

In some embodiments, the synchronization control frame 180 may include a cyclic redundancy check (CRC) field. The CRC field may have any suitable length (e.g., 16 bits) and may be used to transmit a CRC value for the control data 184 of the synchronization control frame 180 following the preamble 182. In some embodiments, the CRC may be calculated in accordance with the CCITT-CRC error detection scheme.

In some embodiments, at least a portion of the synchronization control frame 180 between the preamble 182 and the CRC field may be scrambled in order to reduce the likelihood that a sequence of bits in this interval will periodically match the preamble 182 (and thus may be misinterpreted by the slave node 104 as the start of a new superframe 190), as well as to reduce electromagnetic emissions as noted above. In some such embodiments, the CNT field of the synchronization control frame 180 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization control frame 180, in addition to or in lieu of techniques such as scrambling and/or error encoding as discussed above. For example, a longer synchronization sequence may be used so as to reduce the likelihood that a particular encoding of the remainder of the synchronization control frame 180 will match it. Additionally or alternatively, the remainder of the synchronization control frame may be structured so that the synchronization sequence cannot occur, such as by placing fixed "0" or "1" values at appropriate bits.

The master node 102 may send read and write requests to the slave nodes 104, including both requests specific to communication on the bus 106 and I2C requests. For example, the master node 102 may send read and write requests (indicated using the RW field) to one or more designated slave nodes 104 (using the NAM and node fields) and can indicate whether the request is a request for the slave node 104 specific to the bus 106, an I2C request for the slave node 104, or an I2C request to be passed along to an I2C-compatible peripheral device 108 coupled to the slave node 104 at one or more I2C ports of the slave node 104.

Turning to upstream communication, the synchronization response frame 197 may begin each upstream transmission.

In some embodiments, the synchronization response frame 197 may be 64 bits in length, but any other suitable length may be used. The synchronization response frame 197 may also include a preamble, as discussed above with reference to the preamble 182 of the synchronization control frame 180, followed by data portion. At the end of a downstream transmission, the last slave node 104 on the bus 106 may wait until the RESPCYCS counter has expired and then begin transmitting a synchronization response frame 197 upstream. If an upstream slave node 104 has been targeted by a normal read or write transaction, a slave node 104 may generate its own synchronization response frame 197 and replace the one received from downstream. If any slave node 104 does not see a synchronization response frame 197 from a downstream slave node 104 at the expected time, the slave node 104 will generate its own synchronization response frame 197 and begin transmitting it upstream.

The data portion of the synchronization response frame 197 may include fields that contain data used to communicate response information back to the master node 102. Examples of these fields are discussed below, and some embodiments are illustrated in FIG. 6. In particular, FIG. 6 illustrates example formats for the synchronization response frame 197 in normal mode, I2C mode, and discovery mode, in accordance with various embodiments.

In some embodiments, the synchronization response frame 197 may include a count (CNT) field. The CNT field may have any suitable length (e.g., 2 bits) and may be used to transmit the value of the CNT field in the previously received synchronization control frame 180.

In some embodiments, the synchronization response frame 197 may include an acknowledge (ACK) field. The ACK field may have any suitable length (e.g., 2 bits), and may be inserted by a slave node 104 to acknowledge a command received in the previous synchronization control frame 180 when that slave node 104 generates the synchronization response frame 197. Example indicators that may be communicated in the ACK field include wait, acknowledge, not acknowledge (NACK), and retry. In some embodiments, the ACK field may be sized to transmit an acknowledgment by a slave node 104 that it has received and processed a broadcast message (e.g., by transmitting a broadcast acknowledgment to the master node 102). In some such embodiments, a slave node 104 also may indicate whether the slave node 104 has data to transmit (which could be used, for example, for demand-based upstream transmissions, such as non-TDM inputs from a keypad or touchscreen, or for prioritized upstream transmission, such as when the slave node 104 wishes to report an error or emergency condition).

In some embodiments, the synchronization response frame 197 may include an I2C field. The I2C field may have any suitable length (e.g., 1 bit) and may be used to transmit the value of the I2C field in the previously received synchronization control frame 180.

In some embodiments, the synchronization response frame 197 may include a node field. The node field may have any suitable length (e.g., 4 bits) and may be used to transmit the ID of the slave node 104 that generates the synchronization response frame 197.

In some embodiments, the synchronization response frame 197 may include a data field. The data field may have any suitable length (e.g., 8 bits), and its value may depend on the type of transaction and the ACK response of the slave node 104 that generates the synchronization response frame 197. For discovery transactions, the data field may include the value of the RESPCYCS field in the previously received synchronization control frame 180. When the ACK field indicates a NACK, or when the synchronization response frame 197 is responding to a broadcast transaction, the data field may include a broadcast acknowledge (BA) indicator (in which the last slave node 104 may indicate if the broadcast write was received without error), a discovery error (DER) indicator (indicating whether a newly discovered slave node 104 in a discovery transaction matches an existing slave node 104), and a CRC error (CER) indicator (indicating whether a NACK was caused by a CRC error).

In some embodiments, the synchronization response frame 197 may include a CRC field. The CRC field may have any suitable length (e.g., 16 bits) and may be used to transmit a CRC value for the portion of the synchronization response frame 197 between the preamble and the CRC field.

In some embodiments, the synchronization response frame 197 may include an interrupt request (IRQ) field. The IRQ field may have any suitable length (e.g., 1 bit) and may be used to indicate that an interrupt has been signaled from a slave node 104.

In some embodiments, the synchronization response frame 197 may include an IRQ node (IRQNODE) field. The IRQNODE field may have any suitable length (e.g., 4 bits) and may be used to transmit the ID of the slave node 104 that has signaled the interrupt presented by the IRQ field. In some embodiments, the slave node 104 for generating the IRQ field will insert its own ID into the IRQNODE field.

In some embodiments, the synchronization response frame 197 may include a second CRC (CRC-4) field. The CRC-4 field may have any suitable length (e.g., 4 bits) and may be used to transmit a CRC value for the IRQ and IRQNODE fields.

In some embodiments, the synchronization response frame 197 may include an IRQ field, an IRQNODE field, and a CRC-4 field as the last bits of the synchronization response frame 197 (e.g., the last 10 bits). As discussed above, these interrupt-related fields may have their own CRC protection in the form of CRC-4 (and thus not protected by the preceding CRC field). Any slave node 104 that needs to signal an interrupt to the master node 102 will insert its interrupt information into these fields. In some embodiments, a slave node 104 with an interrupt pending may have higher priority than any slave node 104 further downstream that also has an interrupt pending. The last slave node 104 along the bus 106 (e.g., the slave node 2 in FIG. 1) may always populate these interrupt fields. If the last slave node 104 has no interrupt pending, the last slave node 104 may set the IRQ bit to 0, the IRQNODE field to its node ID, and provide the correct CRC-4 value. For convenience, a synchronization response frame 197 that conveys an interrupt may be referred to herein as an "interrupt frame."

In some embodiments, at least a portion of the synchronization response frame 197 between the preamble 182 and the CRC field may be scrambled in order to reduce emissions. In some such embodiments, the CNT field of the synchronization response frame 197 may be used by scrambling logic to ensure that the scrambled fields are scrambled differently from one superframe to the next. Various embodiments of the system 100 described herein may omit scrambling.

Other techniques may be used to ensure that the preamble 182 can be uniquely identified by the slave nodes 104 or to reduce the likelihood that the preamble 182 shows up elsewhere in the synchronization response frame 197, in addition to or in lieu of techniques such as scrambling and/or error encoding as discussed above. For example, a longer synchronization sequence may be used so as to reduce the likelihood that a particular encoding of the remainder of the synchronization response frame 180 will match it. Additionally or alternatively, the remainder of the synchronization response frame may be structured so that the synchronization sequence cannot occur, such as by placing fixed "0" or "1" values at appropriate bits.

Figure 7:
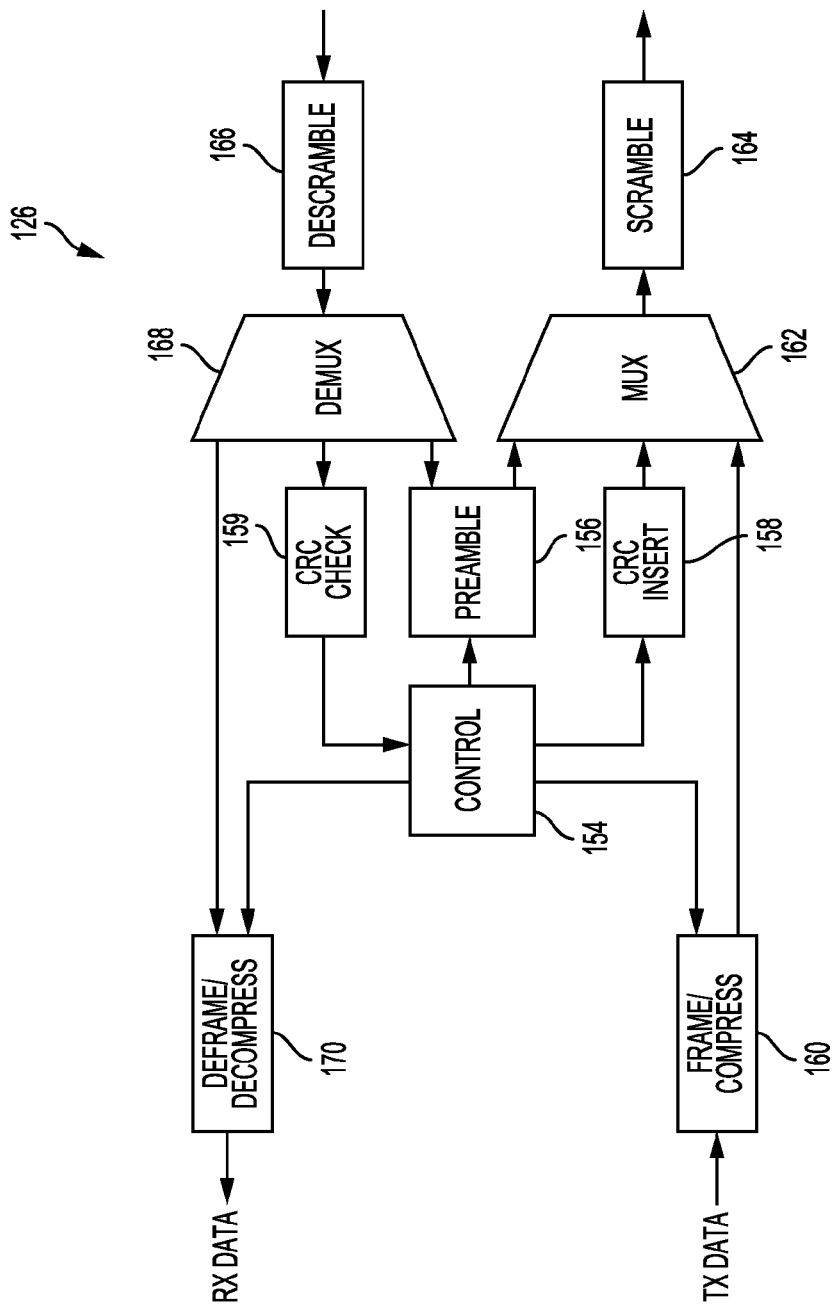
FIG. 7 is a block diagram of various components of the bus protocol circuitry of FIG. 2, in accordance with various embodiments.

FIG. 7 is a block diagram of the bus protocol circuitry 126 of FIG. 2, in accordance with various embodiments. The bus protocol circuitry 126 may include control circuitry 154 to control the operation of the node transceiver 120 in accordance with the protocol for the bus 106 described herein. In particular, the control circuitry 154 may control the generation of synchronization frames for transmission (e.g., synchronization control frames or synchronization response frames, as discussed above), the processing of received synchronization frames, and the performance of control operations specified in received synchronization control frames. The control circuitry 154 may include programmable registers, as discussed below. The control circuitry 154 may create and receive synchronization control frames, react appropriately to received messages (e.g., associated with a synchronization control frame when the bus protocol circuitry 126 is included in a slave node 104 or from an I2C device when the bus protocol circuitry 126 is included in a master node 102), and adjust the framing to the different operational modes (e.g., normal, discovery, standby, etc.).

When the node transceiver 120 is preparing data for transmission along the bus 106, preamble circuitry 156 may be configured to generate preambles for synchronization frames for transmission, and to receive preambles from received synchronization frames. In some embodiments, a downstream synchronization control frame preamble may be sent by the master node 102 every 1024 bits. As discussed above, one or more slave nodes 104 may synchronize to the downstream synchronization control frame preamble and generate local, phase-aligned master clocks from the preamble.

Cyclic redundancy check (CRC) insert circuitry 158 may be configured to generate one or more CRCs for synchronization frames for transmission. Frame/compress circuitry 160 may be configured to take incoming data from the I2S/TDM/PDM transceiver 127 (e.g., from a frame buffer associated with the transceiver 127) and/or the I2C transceiver 129, optionally compress the data, and optionally generate parity check bits or error correction codes (ECC) for the data. A multiplexer (MUX) 162 may multiplex a preamble from the preamble circuitry 156, synchronization frames, and data into a stream for transmission. In some embodiments, the transmit stream may be scrambled by scrambling circuitry 164 before transmission.

For example, in some embodiments, the frame/compress circuitry 160 may apply a floating point compression scheme. In such an embodiment, the control circuitry 154 may transmit 3 bits to indicate how many repeated sign bits are in the number, followed by a sign bit and N-4 bits of data, where N is the size of the data to be transmitted over the bus 106. The use of data compression may be configured by the master node 102 when desired.

In some embodiments, the receive stream entering the node transceiver 120 may be descrambled by the descrambling circuitry 166. A demultiplexer (DEMUX) 168 may demultiplex the preamble, synchronization frames, and data from the receive stream. CRC check circuitry 159 on the receive side may check received synchronization frames for the correct CRC. When the CRC check circuitry 159 identifies a CRC failure in an incoming synchronization control frame 180, the control circuitry 154 may be notified of the failure and will not perform any control commands in the control data 184 of the synchronization control frame 180. When the CRC check circuitry 159 identifies a CRC failure in an incoming synchronization response frame 197, the control circuitry 154 may be notified of the failure and may generate an interrupt for transmission to the host 110 in an interrupt frame. Deframe/decompress circuitry 170 may accept receive data, optionally check its parity, optionally perform error detection and correction (e.g., single error correction-double error detection (SECDED)), optionally decompress the data, and may write the receive data to the I2S/TDM/PDM transceiver 127 (e.g., a frame buffer associated with the transceiver 127) and/or the I2C transceiver 129.

As discussed above, upstream and downstream data may be transmitted along the bus 106 in TDM data slots within a superframe 190. The control circuitry 154 may include registers dedicated to managing these data slots on the bus 106, a number of examples of which are discussed below. When the control circuitry 154 is included in a master node 102, the values in these registers may be programmed into the control circuitry 154 by the host 110. When the control circuitry 154 is included in a slave node 104, the values in these registers may be programmed into the control circuitry 154 by the master node 102.

In some embodiments, the control circuitry 154 may include a downstream slots (DNSLOTS) register. When the node transceiver 120 is included in the master node 102, this register may hold the value of the total number of downstream data slots. This register may also define the number of data slots that will be used for combined I2S/TDM/PDM receive by the I2S/TDM/PDM transceiver 127 in the master node 102. In a slave node 104, this register may define the number of data slots that are passed downstream to the next slave node 104 before or after the addition of locally generated downstream slots, as discussed in further detail below with reference to LDNSLOTS.

In some embodiments, the control circuitry 154 may include a local downstream slots (LDNSLOTS) register. This register may be unused in the master node 102. In a slave node 104, this register may define the number of data slots that the slave node 104 will use and not retransmit. Alternatively, this register may define the number of slots that the slave node 104 may contribute to the downstream data link 106.

In some embodiments, the control circuitry 154 may include an upstream slots (UPSLOTS) register. In the master node 102, this register may hold the value of the total number of upstream data slots. This register may also define the number of slots that will be used for I2S/TDM transmit by the I2S/TDM/PDM transceiver 127 in the master node 102. In a slave node 104, this register may define the number of data slots that are passed upstream before the slave node 104 begins to add its own data.

In some embodiments, the control circuitry 154 may include a local upstream slots (LUPSLOTS) register. This register may be unused in the master node 102. In a slave node 104, this register may define the number of data slots that the slave node 104 will add to the data received from downstream before it is sent upstream. This register may also define the number of data slots that will be used for combined I2S/TDM/PDM receive by the I2S/TDM/PDM transceiver 127 in the slave node 104.

In some embodiments, the control circuitry 154 may include a broadcast downstream slots (BCDNSLOTS) register. This register may be unused in the master node 102. In a slave node 104, this register may define the number of broadcast data slots. In some embodiments, broadcast data slots may always come at the beginning of the data field. The data in the broadcast data slots may be used by multiple slave nodes 104 and may be passed downstream by all slave nodes 104 whether or not they are used.

In some embodiments, the control circuitry 154 may include a slot format (SLOTFMT) register. This register may define the format of data for upstream and downstream transmissions. The data size for the I2S/TDM/PDM transceiver 127 may also be determined by this register. In some embodiments, valid data sizes include 8, 12, 16, 20, 24, 28, and 32 bits. This register may also include bits to enable floating point compression for downstream and upstream traffic. When floating point compression is enabled, the I2S/TDM data size may be 4 bits larger than the data size over the bus 106. All nodes in the system 100 may have the same values for SLOTFMT when data slots are enabled, and the nodes may be programmed by a broadcast write so that all nodes will be updated with the same value.

FIGS. 8-11 illustrate examples of information exchange along the bus 106, in accordance with various embodiments of the bus protocols described herein. In particular, FIGS. 8-11 illustrate embodiments in which each slave node 104 is coupled to one or more speakers and/or one or more microphones as the peripheral device 108. This is simply illustrative, as any desired arrangement of peripheral device 108 may be coupled to any particular slave node 104 in accordance with the techniques described herein.

Figure 8:
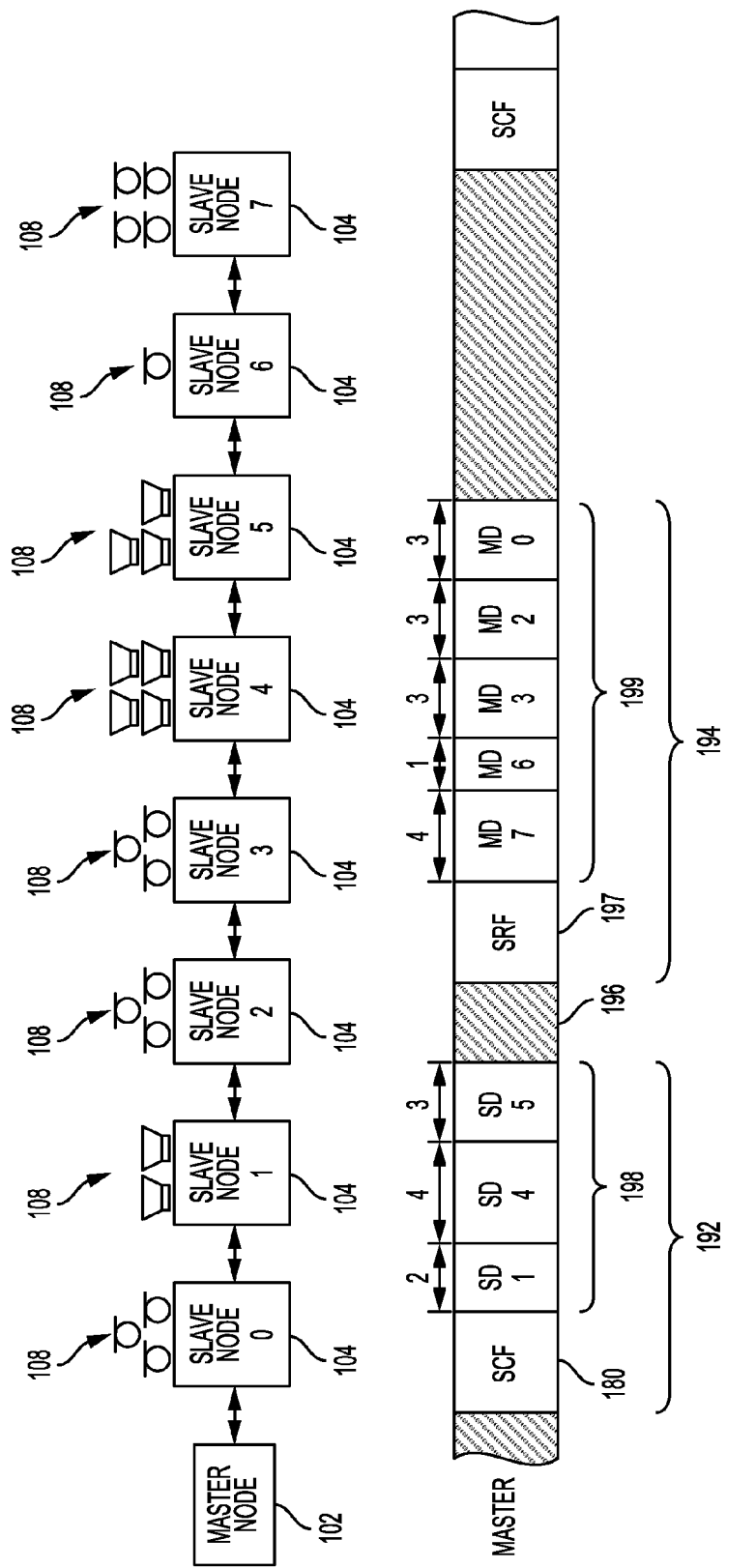
FIGS. 8-11 illustrate examples of information exchange along a two-wire bus, in accordance with various embodiments of the bus protocols described herein.

To begin, FIG. 8 illustrates signaling and timing considerations for bi-directional communication on the bus 106, in accordance with various embodiments. The slave nodes 104 depicted in FIG. 8 have various numbers of sensor/actuator elements, and so different amounts of data may be sent to, or received from, the various slave nodes 104. Specifically, slave node 1 has two elements, slave node 4 has four elements, and slave node 5 has three elements, so the data transmitted by the master node 102 includes two time slots for slave node 1, four time slots for slave node 4, and three time slots for slave node 5. Similarly, slave node 0 has three elements, slave node 2 has three elements, slave node 3 has three elements, slave node 6 has one element, and slave node 7 has four elements, so the data transmitted upstream by those slave nodes 104 includes the corresponding number of time slots. It should be noted that there need not have to be a one-to-one correlation between elements and time slots. For example, a microphone array, included in the peripheral device 108, having three microphones may include a digital signal processor that combines signals from the three microphones (and possibly also information received from the master node 102 or from other slave nodes 104) to produce a single data sample, which, depending on the type of processing, could correspond to a single time slot or multiple time slots.

In FIG. 8, the master node 102 transmits a synchronization control frame (SCF) followed by data for speakers coupled to specific slave nodes 104 (SD). Each successive slave node 104 forwards the synchronization control frame and also forwards at least any data destined for downstream slave nodes 104. A particular slave node 104 may forward all data or may remove data destined for that slave node 104. When the last slave node 104 receives the synchronization control frame, that slave node 104 transmits the synchronization response frame (SRF) optionally followed by any data that the slave node 104 is permitted to transmit. Each successive slave node 104 forwards the synchronization response frame along with any data from downstream slave nodes 104 and optionally inserts data from one or more microphones coupled to the particular slave nodes 104 (MD). In the example of FIG. 8, the master node 102 sends data to slave nodes 1, 4, and 5 (depicted in FIG. 8 as active speakers) and receives data from slave nodes 7, 6, 3, 2, and 0 (depicted in FIG. 8 as microphone arrays).

Figure 9:
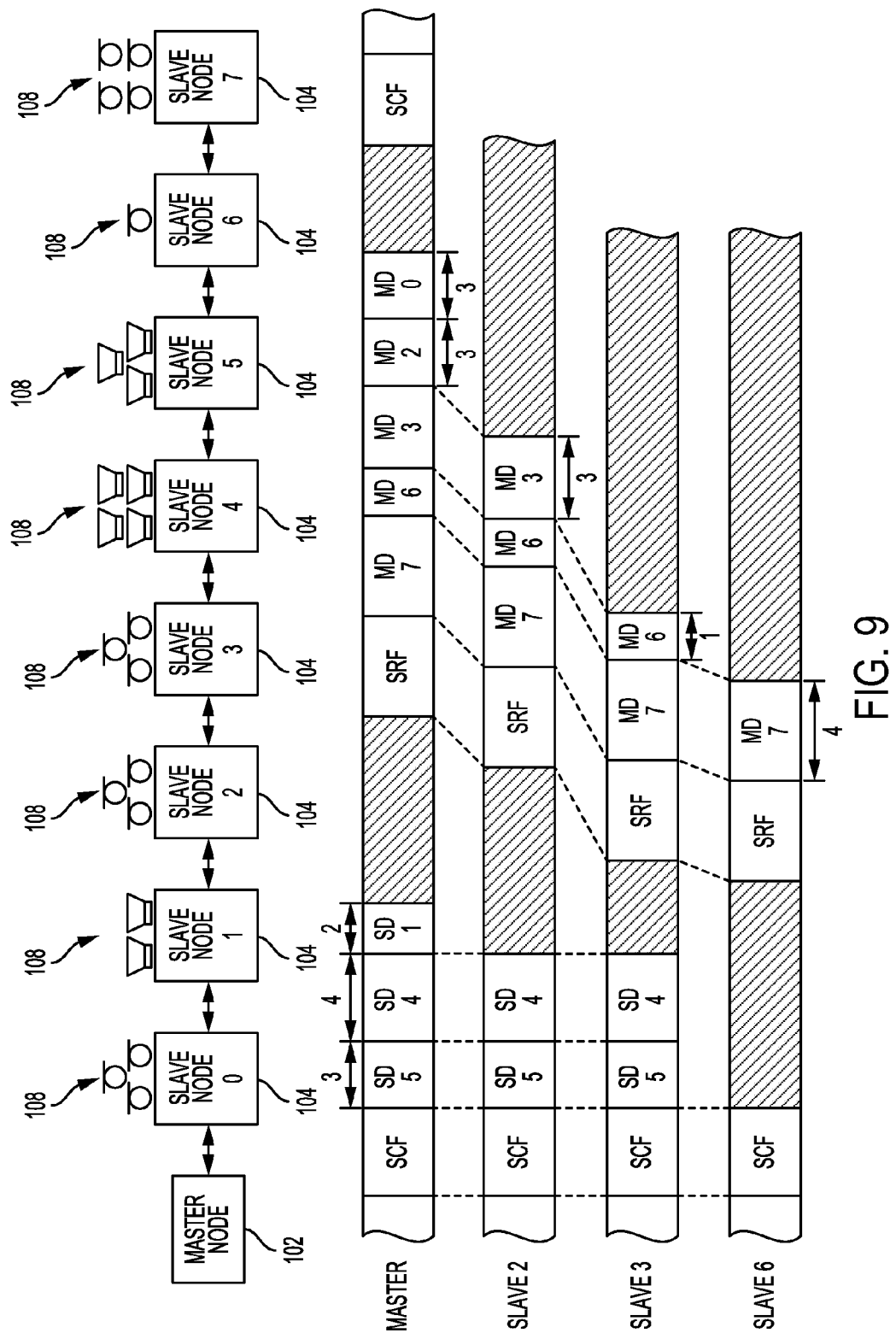

FIG. 9 schematically illustrates the dynamic removal of data from a downstream transmission and insertion of data into an upstream transmission, from the perspective of the downstream DS transceiver 124, in accordance with various embodiments. In FIG. 9, as in FIG. 8, the master node 102 transmits a synchronization control frame (SCF) followed by data for slave nodes 1, 4, and 5 (SD) in reverse order (e.g., data for slave node 5 is followed by data for slave node 4, which is followed by data for slave node 1, etc.) (see the row labeled MASTER). When slave node 1 receives this transmission, slave node 1 removes its own data and forwards to slave node 2 only the synchronization control frame followed by the data for slave nodes 5 and 4. Slave nodes 2 and 3 forward the data unchanged (see the row labeled SLAVE 2), such that the data forwarded by slave node 1 is received by slave node 4 (see the row labeled SLAVE 3). Slave node 4 removes its own data and forwards to slave node 5 only the synchronization control frame followed by the data for slave node 5, and, similarly, slave node 5 removes its own data and forwards to slave node 6 only the synchronization control frame. Slave node 6 forwards the synchronization control frame to slave node 7 (see the row labeled SLAVE 6).

At this point, slave node 7 transmits to slave node 6 the synchronization response frame (SRF) followed by its data (see the row labeled SLAVE 6). Slave node 6 forwards to slave node 5 the synchronization response frame along with the data from slave node 7 and its own data, and slave node 5 in turn forwards to slave node 4 the synchronization response frame along with the data from slave nodes 7 and 6. Slave node 4 has no data to add, so it simply forwards the data to slave node 3 (see the row labeled SLAVE 3), which forwards the data along with its own data to slave node 2 (see the row labeled SLAVE 2), which in turn forwards the data along with its own data to slave node 1. Slave node 1 has no data to add, so it forwards the data to slave node 0, which forwards the data along with its own data. As a result, the master node 102 receives the synchronization response frame followed by the data from slave nodes 7, 6, 3, 2, and 0 (see the row labeled MASTER).

Figure 10:
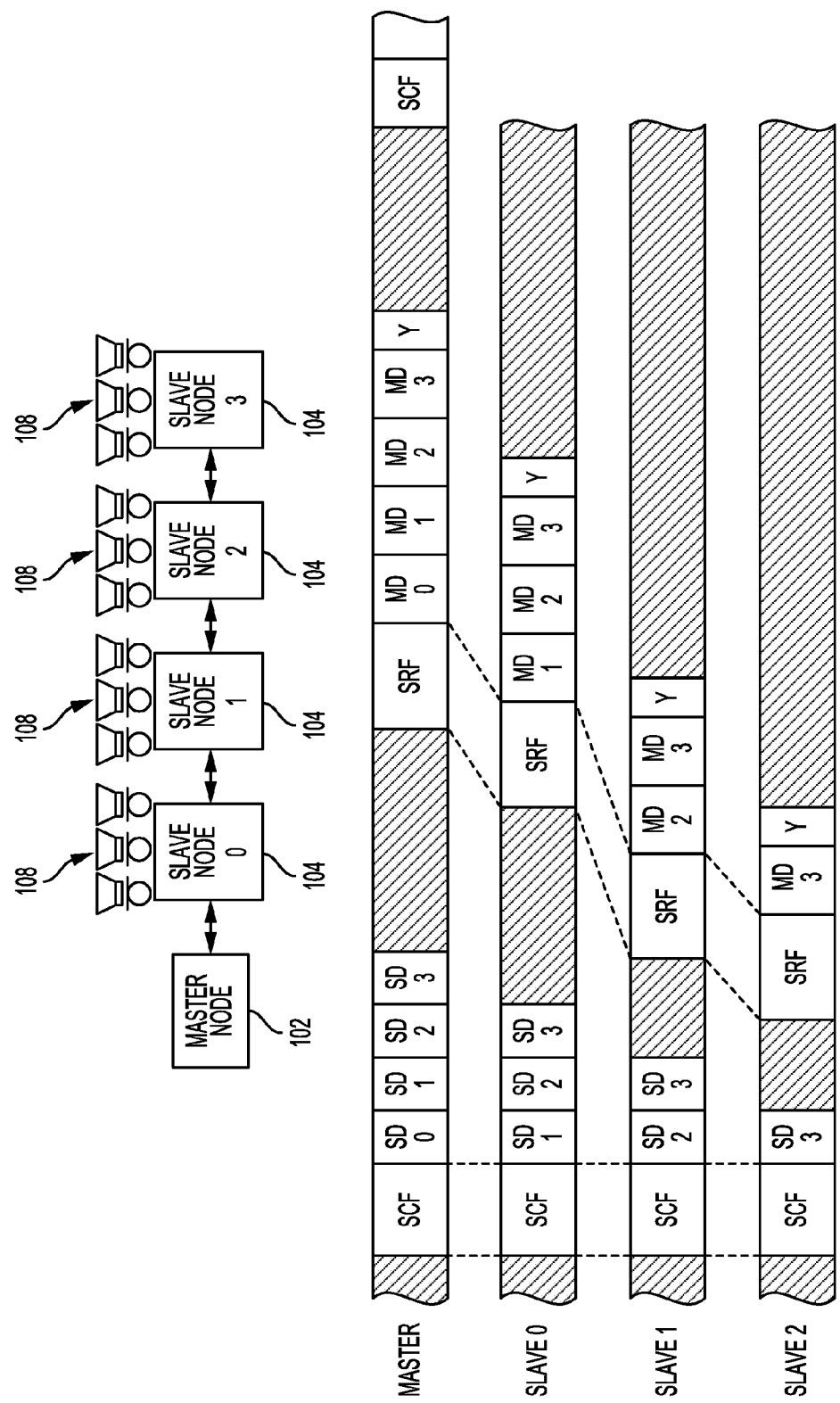

FIG. 10 illustrates another example of the dynamic removal of data from a downstream transmission and insertion of data into an upstream transmission, from the perspective of the downstream DS transceiver 124, as in FIG. 9, although in FIG. 10, the slave nodes 104 are coupled with both sensors and actuators as the peripheral device 108 such that the master node 102 sends data downstream to all of the slave nodes 104 and receives data back from all of the slave nodes 104. Also, in FIG. 10, the data is ordered based on the node address to which it is destined or from which it originates. The data slot labeled "Y" may be used for a data integrity check or data correction.

Figure 11:
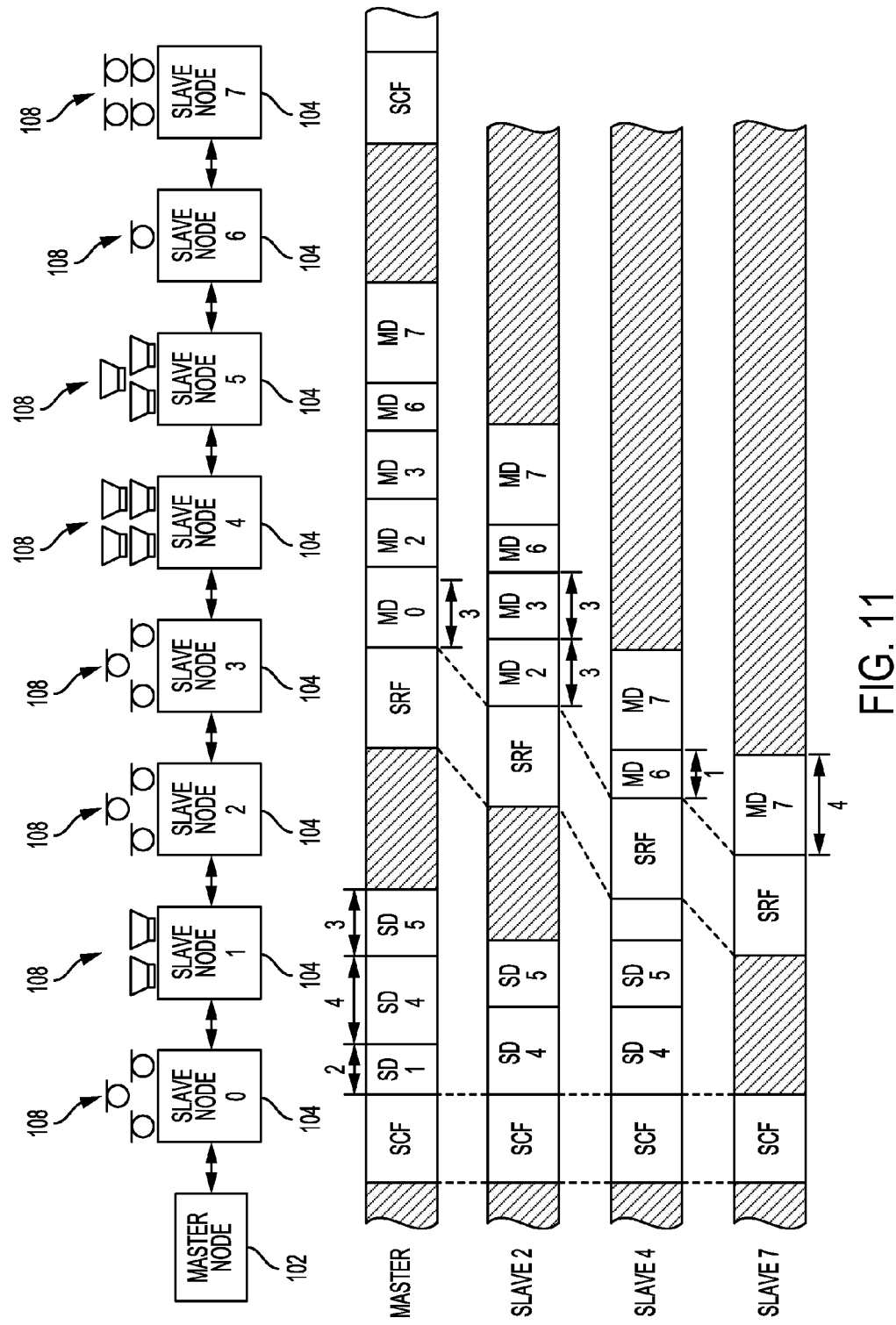

FIG. 11 illustrates another example of the dynamic removal of data from a downstream transmission and insertion of data into an upstream transmission, from the perspective of the downstream DS transceiver 124, as in FIG. 9, although in FIG. 11, the data is conveyed downstream and upstream in sequential order rather than reverse order. Buffering at each slave node 104 allows for selectively adding, removing, and/or forwarding data.

As discussed above, each slave node 104 may remove data from downstream or upstream transmissions and/or may add data to downstream or upstream transmissions. Thus, for example, the master node 102 may transmit a separate sample of data to each of a number of slave nodes 104, and each such slave node 104 may remove its data sample and forward only data intended for downstream slaves. On the other hand, a slave node 104 may receive data from a downstream slave node 104 and forward the data along with additional data. One advantage of transmitting as little information as needed is to reduce the amount of power consumed collectively by the system 100.

The system 100 may also support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104, although a particular slave node 104 may "consume" the broadcast message, (i.e., not pass the broadcast transmission along to the next slave node 104).

The system 100 may also support upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102.

Thus, in various embodiments, the slave nodes 104 may operate as active/intelligent repeater nodes, with the ability to selectively forward, drop, and add information. The slave nodes 104 may generally perform such functions without necessarily decoding/examining all of the data, since each slave node 104 knows the relevant time slot(s) within which it will receive/transmit data, and hence can remove data from or add data into a time slot. Notwithstanding that the slave nodes 104 may not need to decode/examine all data, the slave nodes 104 may typically re-clock the data that it transmits/forwards. This may improve the robustness of the system 100.

Figure 12:
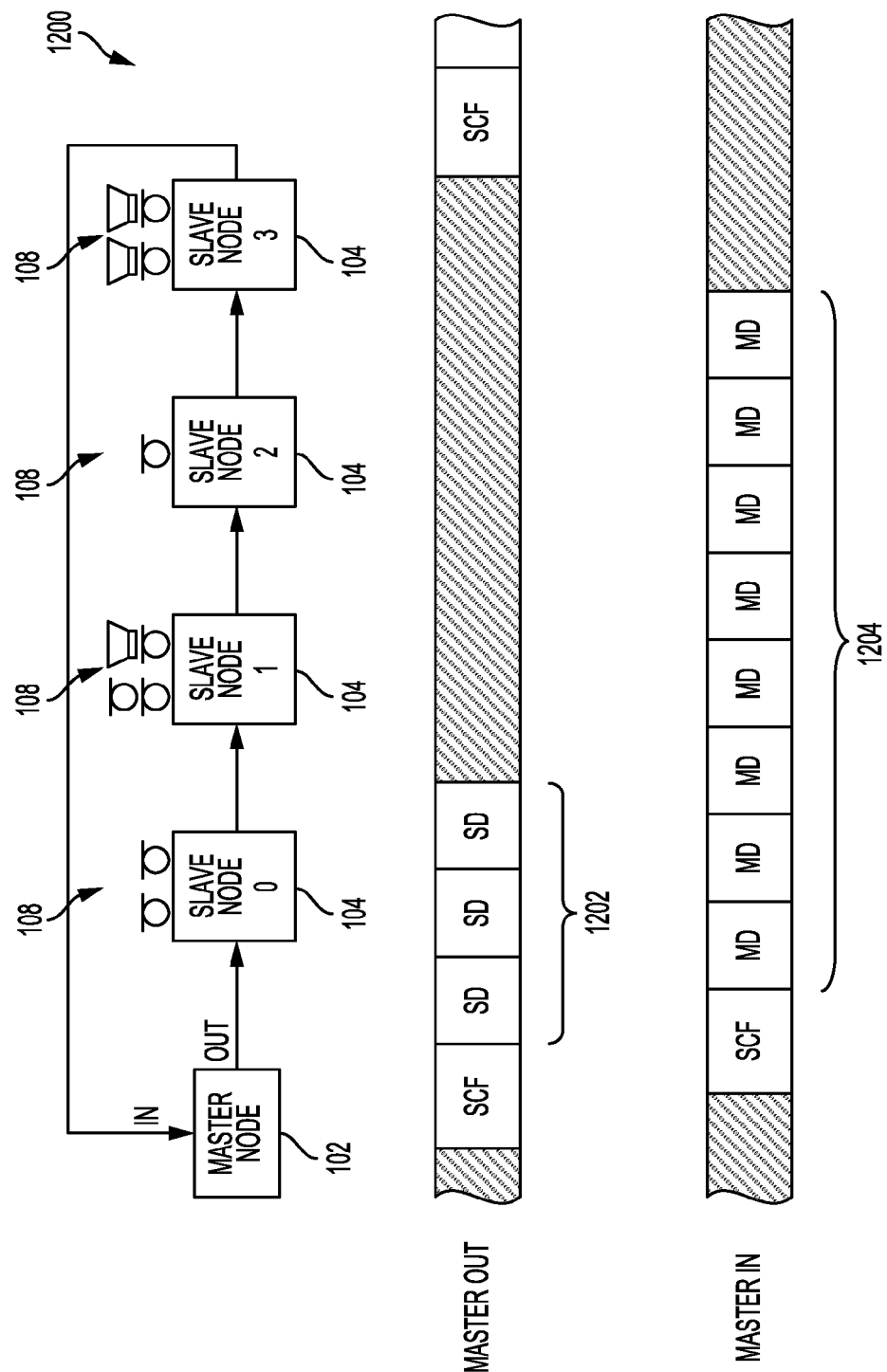
FIG. 12 illustrates a ring topology for the two-wire bus and a uni-directional communication scheme thereon, in accordance with various embodiments.

In some embodiments, the bus 106 may be configured for uni-directional communications in a ring topology. For example, FIG. 12 illustrates an arrangement 1200 of the master node 102 and four slave nodes 104 in a ring topology, and illustrates signaling and timing considerations for uni-directional communication in the arrangement 1200, in accordance with various embodiments. In such embodiments, the transceivers 120 in the nodes may include a receive-only transceiver (MASTER IN) and a transmit-only transceiver (MASTER OUT), rather than two bi-directional transceivers for upstream and downstream communication. In the link-layer synchronization scheme illustrated in FIG. 12, the master node 102 transmits a synchronization control frame (SCF) 180, optionally followed by "downstream" data 1202 for the three speakers coupled to various slave nodes 104 (the data for the different speakers may be arranged in any suitable order, as discussed above with reference to FIGS. 8-11), and each successive slave node 104 forwards the synchronization control frame 180 along with any "upstream" data from prior slave nodes 104 and "upstream" data of its own to provide "upstream" data 1204 (e.g., the data from the eight different microphones may be arranged in any suitable order, as discussed above with reference to FIGS. 8-11).

As described herein, data may be communicated between elements of the system 100 in any of a number of ways. In some embodiments, data may be sent as part of a set of synchronous data slots upstream (e.g., using the data slots 199) by a slave node 104 or downstream (e.g., using the data slots 198) by a slave node 104 or a master node 102. The volume of such data may be adjusted by changing the number of bits in a data slot, or including extra data slots. Data may also be communicated in the system 100 by inclusion in a synchronization control frame 180 or a synchronization response frame 197. Data communicated this way may include I2C control data from the host 110 (with a response from a peripheral device 108 associated with a slave node 104); accesses to registers of the slave nodes 104 (e.g., for discovery and configuration of slots and interfaces) that may include write access from the host 110/master node 102 to a slave node 104 and read access from a slave node 104 to the host 110/master node 102; and event signaling via interrupts from a peripheral device 108 to the host 110. In some embodiments, GPIO pins may be used to convey information from a slave node 104 to the master node 102 (e.g., by having the master node 102 poll the GPIO pins over I2C, or by having a node transceiver 120 of a slave node 104 generate an interrupt at an interrupt request pin). For example, in some such embodiments, a host 110 may send information to the master node 102 via I2C, and then the master node 102 may send that information to the slave via the GPIO pins. Any of the types of data discussed herein as transmitted over the bus 106 may be transmitted using any one or more of these communication pathways. Other types of data and data communication techniques within the system 100 may be disclosed herein.

Figure 13:
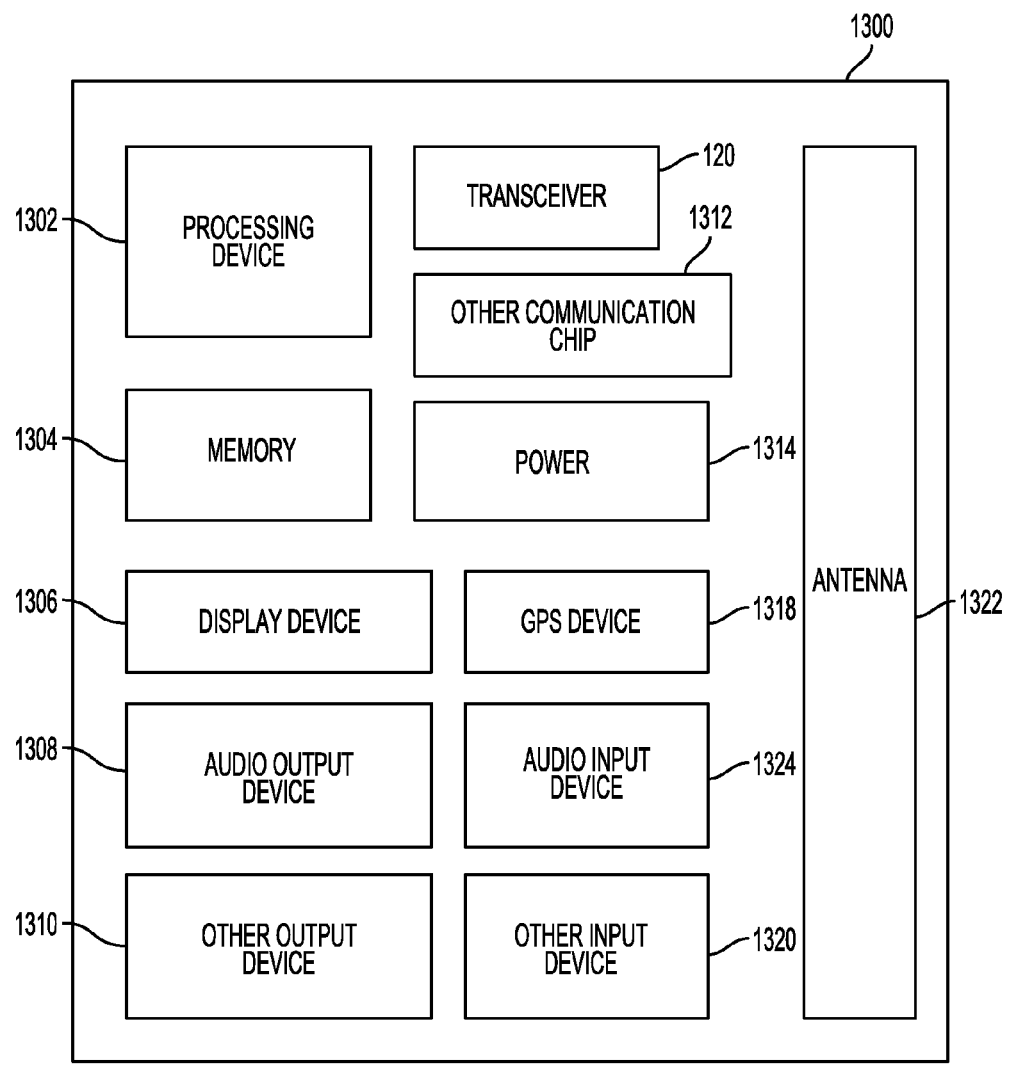
FIG. 13 schematically illustrates a device that may serve as a node or host in the system of FIG. 1, in accordance with various embodiments.

Embodiments of the present disclosure may be implemented into a system using any suitable hardware and/or software to configure as desired. FIG. 13 schematically illustrates a device 1300 that may serve as a host or a node (e.g., a host 110, a master node 102, or a slave node 104) in the system 100, in accordance with various embodiments. A number of components are illustrated in FIG. 13 as included in the device 1300, but any one or more of these components may be omitted or duplicated, as suitable for the application.

Additionally, in various embodiments, the device 1300 may not include one or more of the components illustrated in FIG. 13, but the device 1300 may include interface circuitry for coupling to the one or more components. For example, the device 1300 may not include a display device 1306, but may include display device interface circuitry (e.g., a connector and driver circuitry) to which a display device 1306 may be coupled. In another set of examples, the device 1300 may not include an audio input device 1324 or an audio output device 1308, but may include audio input or output device interface circuitry (e.g., connectors and supporting circuitry) to which an audio input device 1324 or audio output device 1308 may be coupled.

The device 1300 may include the node transceiver 120, in accordance with any of the embodiments disclosed herein, for managing communication along the bus 106 when the device 1300 is coupled to the bus 106. The device 1300 may include a processing device 1302 (e.g., one or more processing devices), which may be included in the node transceiver 120 or separate from the node transceiver 120. As used herein, the term "processing device" may refer to any device or portion of a device that processes electronic data from registers and/or memory to transform that electronic data into other electronic data that may be stored in registers and/or memory. The processing device 1302 may include one or more digital signal processors (DSPs), application-specific integrated circuits (ASICs), central processing units (CPUs), graphics processing units (GPUs), cryptoprocessors, or any other suitable processing devices. The device 1300 may include a memory 1304, which may itself include one or more memory devices such as volatile memory (e.g., dynamic random access memory (DRAM)), non-volatile memory (e.g., read-only memory (ROM)), flash memory, solid state memory, and/or a hard drive.

In some embodiments, the memory 1304 may be employed to store a working copy and a permanent copy of programming instructions to cause the device 1300 to perform any suitable ones of the techniques disclosed herein. In some embodiments, machine-accessible media (including non-transitory computer-readable storage media), methods, systems, and devices for performing the above-described techniques are illustrative examples of embodiments disclosed herein for communication over a two-wire bus. For example, a computer-readable media (e.g., the memory 1304) may have stored thereon instructions that, when executed by one or more of the processing devices included in the processing device 1302, cause the device 1300 to perform any of the techniques disclosed herein.

In some embodiments, the device 1300 may include another communication chip 1312 (e.g., one or more other communication chips). For example, the communication chip 1312 may be configured for managing wireless communications for the transfer of data to and from the device 1300. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The one or more communication chips 1312 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The one or more communication chips 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The one or more communication chips 1312 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The device 1300 may include an antenna 1322 to facilitate wireless communications and/or to receive other wireless communications (such as AM or FM radio transmissions).

In some embodiments, the communication chip 1312 may manage wired communications using a protocol other than the protocol for the bus 106 described herein. Wired communications may include electrical, optical, or any other suitable communication protocols. Examples of wired communication protocols that may be enabled by the communication chip 1312 include Ethernet, controller area network (CAN), I2C, media-oriented systems transport (MOST), or any other suitable wired communication protocol.

As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as GPS, EDGE, GPRS, CDMA, WiMAX, LTE, EV-DO, or others. In some embodiments, a first communication chip 1312 may be dedicated to wireless communications, and a second communication chip 1312 may be dedicated to wired communications.

The device 1300 may include battery/power circuitry 1314. The battery/power circuitry 1314 may include one or more energy storage devices (e.g., batteries or capacitors) and/or circuitry for coupling components of the device 1300 to an energy source separate from the device 1300 (e.g., AC line power, voltage provided by a car battery, etc.). For example, the battery/power circuitry 1314 may include the upstream filtering circuitry 132 and the downstream filtering circuitry 131 discussed above with reference to FIG. 2 and could be charged by the bias on the bus 106.

The device 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The device 1300 may include an audio output device 1308 (or corresponding interface circuitry, as discussed above). The audio output device 1308 may include any device that generates an audible indicator, such as speakers, headsets, or earbuds, for example.

The device 1300 may include an audio input device 1324 (or corresponding interface circuitry, as discussed above). The audio input device 1324 may include any device that generates a signal representative of a sound, such as microphones, microphone arrays, or digital instruments (e.g., instruments having a musical instrument digital interface (MIDI) output).

The device 1300 may include a global positioning system (GPS) device 1318 (or corresponding interface circuitry, as discussed above). The GPS device 1318 may be in communication with a satellite-based system and may receive a location of the device 1300, as known in the art.

The device 1300 may include another output device 1310 (or corresponding interface circuitry, as discussed above). Examples of the other output device 1310 may include an audio codec, a video codec, a printer, a wired or wireless transmitter for providing information to other devices, or an additional storage device. Additionally, any suitable ones of the peripheral devices 108 discussed herein may be included in the other output device 1310.

The device 1300 may include another input device 1320 (or corresponding interface circuitry, as discussed above). Examples of the other input device 1320 may include an accelerometer, a gyroscope, an image capture device, a keyboard, a cursor control device such as a mouse, a stylus, a touchpad, a bar code reader, a Quick Response (QR) code reader, or a radio frequency identification (RFID) reader. Additionally, any suitable ones of the sensors or peripheral devices 108 discussed herein may be included in the other input device 1320.

Any suitable ones of the display, input, output, communication, or memory devices described above with reference to the device 1300 may serve as the peripheral device 108 in the system 100. Alternatively or additionally, suitable ones of the display, input, output, communication, or memory devices described above with reference to the device 1300 may be included in a host (e.g., the host 110) or a node (e.g., a master node 102 or a slave node 104).

FIGS. 14-22 illustrate systems and techniques for distributed audio coordination within various embodiments of the system 100. In particular, FIGS. 14-16 and 19 illustrate audio systems to which the distributed audio coordination techniques disclosed herein may be applied. Describing these techniques with respect to audio systems is simply illustrative, and the systems and techniques disclosed herein may be applied to distributed coordination for any suitable peripheral devices.

As noted above, the system 100 may support master-to-slave communications as well as slave-to-slave communications. For example, as discussed above, the system 100 may support broadcast transmissions (and multicast transmissions) from the master node 102 to the slave nodes 104, specifically through configuration of the downstream slot usage of the slave nodes 104. Each slave node 104 may process the broadcast transmission and pass it along to the next slave node 104 without "consuming" the broadcast transmission, although a particular slave node 104 may "consume" the broadcast message, (i.e., not pass the broadcast transmission along to the next slave node 104). The system 100 may also support addressed upstream transmissions (e.g., from a particular slave node 104 to one or more other slave nodes 104). Such upstream transmissions can include unicast, multicast, and/or broadcast upstream transmissions. With upstream addressing, as discussed above with reference to downstream transmissions, a slave node 104 may determine whether or not to remove data from an upstream transmission and/or whether or not to pass an upstream transmission along to the next upstream slave node 104 based on configuration of the upstream slot usage of the slave nodes 104. Thus, for example, data may be passed by a particular slave node 104 to one or more other slave nodes 104 in addition to, or in lieu of, passing the data to the master node 102. Such slave-slave relationships may be configured, for example, via the master node 102. Thus, the distributed audio coordination techniques disclosed herein may utilize master-to-slave communications and/or slave-to-slave communications in any suitable combination.

Figure 14:
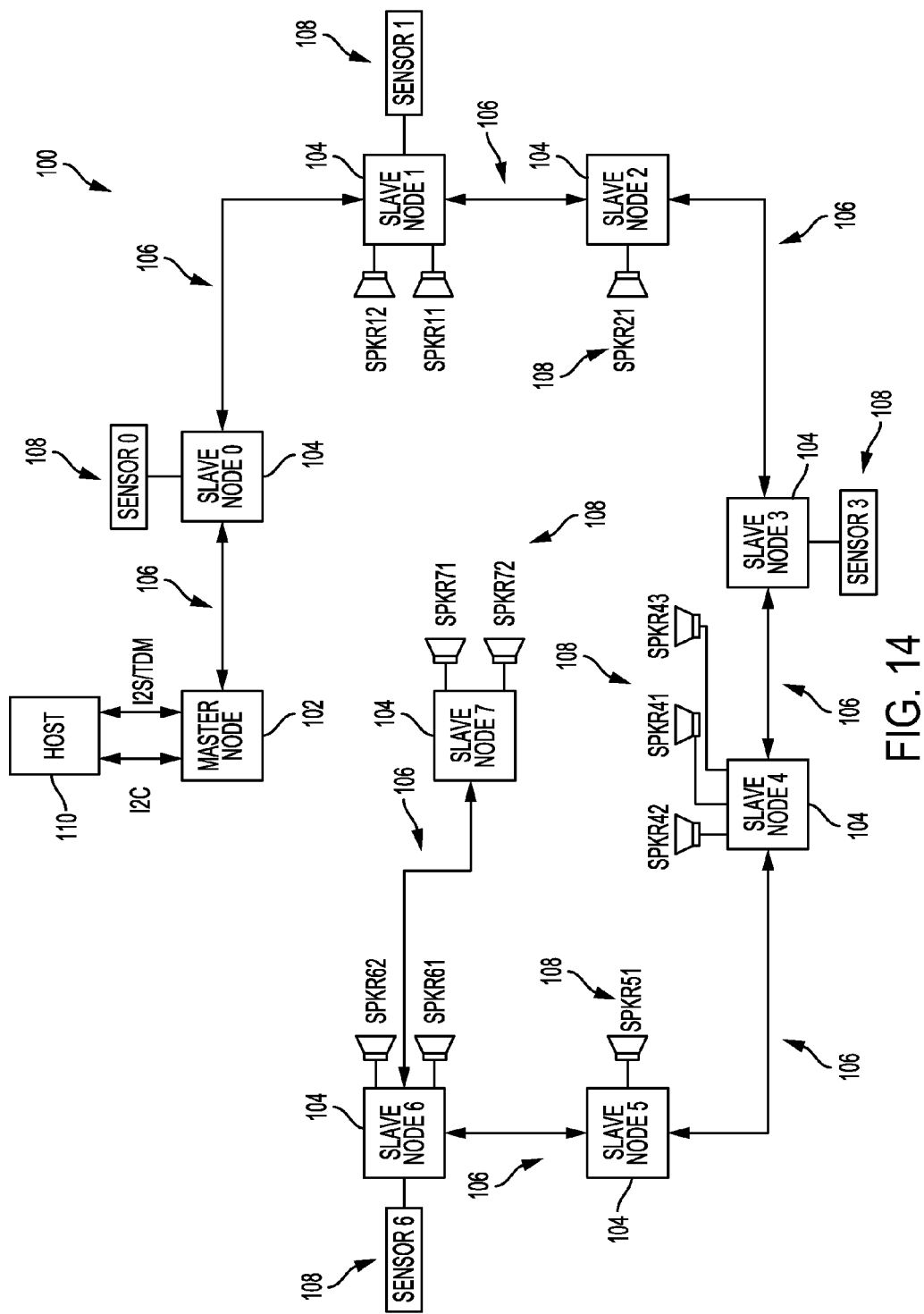
FIG. 14 is a block diagram of an example arrangement of audio components and sensors in a two-wire communication system, in accordance with various embodiments.

FIG. 14 is a block diagram of an example arrangement of audio components and sensors in an embodiment of the system 100, in accordance with various embodiments. Arrangements like that depicted in FIG. 14 may be particularly useful for managing audio in a vehicle or other enclosed space. In a vehicle setting, the host 110 and/or the master node 102 may be included in a head unit or vehicle function box, for example, and the conductors of the bus 106 may be routed through the walls, seats, floor, seatbelt, and other structures in the vehicle cabin.

The system 100 of FIG. 14 includes a number of slave nodes 104 (i.e., the slave nodes 0-7) daisy-chained along the bus 106. Each slave node 104 may be coupled to a peripheral device 108. For example, the peripheral device 108 associated with the slave node 0 may include a sensor 0. In some embodiments, the slave node 0 may be located within or behind a vehicle dashboard, and the sensor 0 may include an environmental sensor, such as a moisture or gas sensor, and/or a microphone. The peripheral device 108 associated with the slave node 1 may include a sensor 1, a speaker 11, and a speaker 12. In some embodiments, the slave node 1 and its peripheral device 108 may be located within or near a front passenger side door. The peripheral device 108 associated with the slave node 2 may include a speaker 21. In some embodiments, the slave node 2 and its peripheral device 108 may be located within or near a rear passenger side door.

The peripheral device 108 associated with the slave node 3 may include a sensor 3. In some embodiments, the slave node 3 may be located behind a rear passenger seat, and the sensor 3 may include an environmental sensor and/or a microphone. The peripheral device 108 associated with the slave node 4 may include a speaker 41, a speaker 42, and a speaker 43. In some embodiments, the slave node 4 may be located at the center rear of the passenger compartment, and the speakers 41-43 may be arranged across the rear of the passenger compartment.

The peripheral device 108 associated with the slave node 5 may include a speaker 51. In some embodiments, the slave node 5 and its peripheral device 108 may be located within or near a rear driver side door. The peripheral device 108 associated with the slave node 6 may include a sensor 6, a speaker 61, and a speaker 62. In some embodiments, the slave node 6 and its peripheral device 108 may be located within or near a front driver side door. The peripheral device 108 associated with the slave node 7 may include a speaker 71 and a speaker 72. In some embodiments, the slave node 7 and its associated peripheral device 108 may be located in a center console of the passenger compartment.

Figure 15:
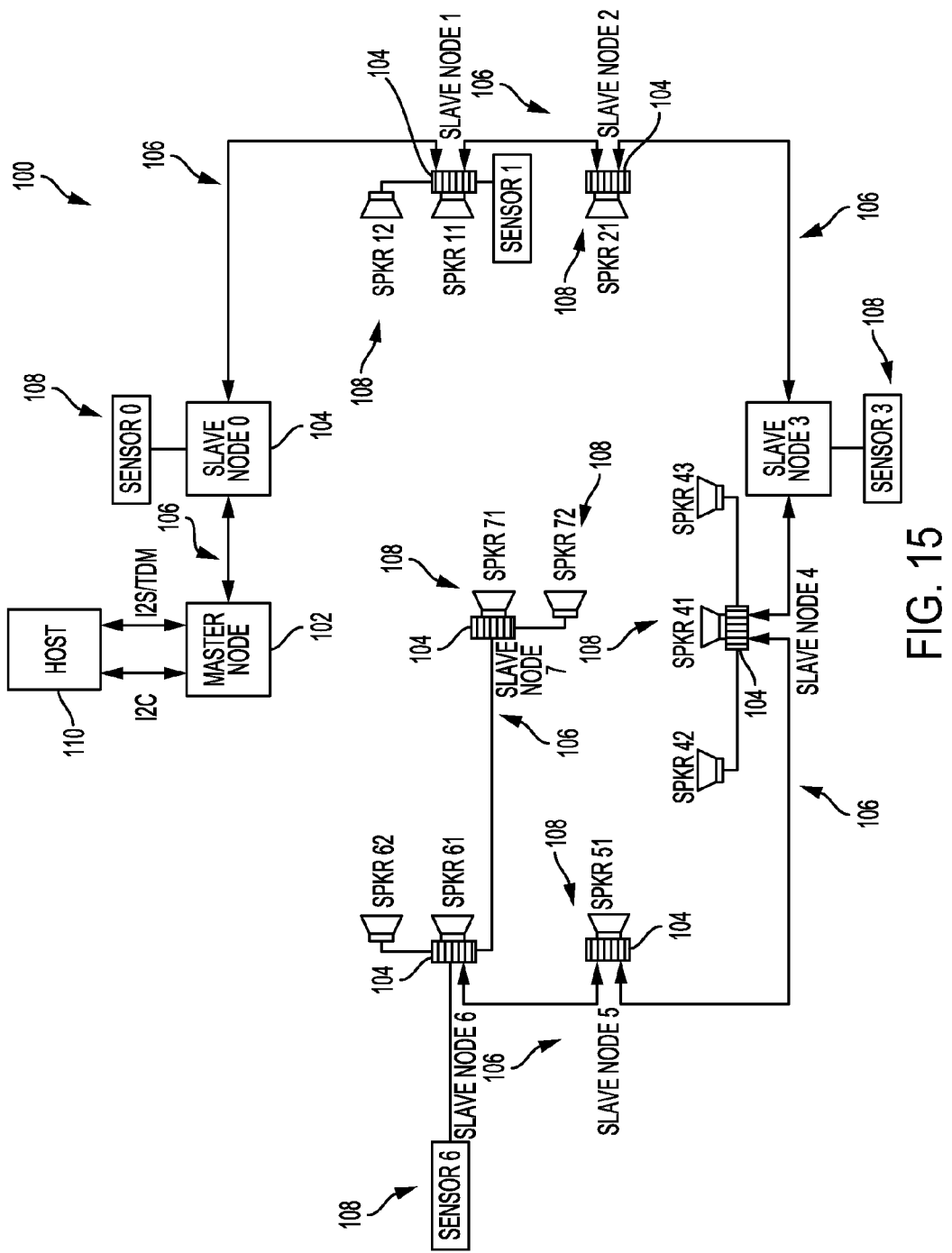
FIG. 15 is a block diagram of a particular example of the arrangement of FIG. 14, in accordance with various embodiments.

FIG. 15 is a block diagram of a particular example of the arrangement of FIG. 14, in accordance with various embodiments. In FIG. 15, some of the slave nodes 104 are shown as embodied in a distributed amplifier device. In particular, slave nodes 1, 2, 4, 5, 6, and 7 are shown as integrally attached to a speaker (i.e., the speakers 11, 21, 41, 51, 61, and 71, respectively). The distributed amplifier device of slave nodes 1, 4, 6, and 7 are also coupled to at least one additional speaker, as shown in FIG. 15.

Figure 16:
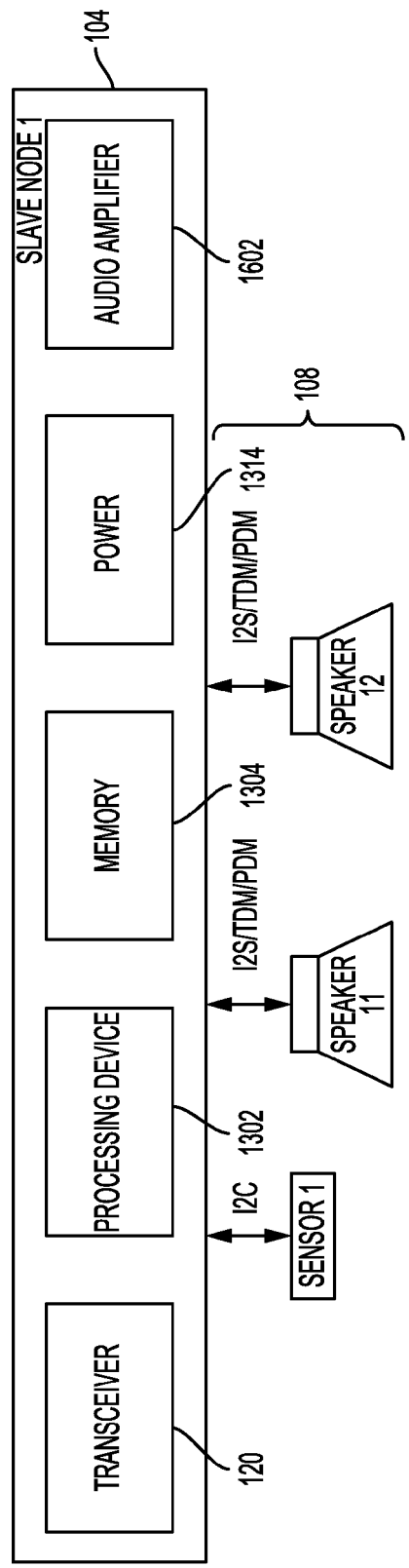
FIG. 16 is a block diagram of a distributed amplifier embodiment of an example slave node, and its associated peripheral device, from the arrangement of FIG. 15, in accordance with various embodiments.

A block diagram of a distributed amplifier embodiment of a slave node 104 as illustrated in FIG. 16. In particular, FIG. 16 is a block diagram of a distributed amplifier embodiment of the slave node 1, and its associated peripheral device 108, from the arrangement of FIG. 15, in accordance with various embodiments. The slave node 1 may include the node transceiver 120 (FIG. 2), a processing device 1302 (FIG. 13), a memory 1304 (FIG. 13), battery/power circuitry 1314 (FIG. 13), and an audio amplifier 1602. In some embodiments, the audio amplifier 1602 may have multiple outputs, and thus may be able to provide amplified audio signals to multiple speakers (e.g., the speakers 11 and 12).

The components illustrated in the slave node 104 of FIG. 16 may be included in a common housing, and that housing may have connectors to couple the slave node 104 to the peripheral device 108. As illustrated in FIG. 16, the slave node 1 may be coupled to the speaker 11 and to the speaker 12 via I2S/TDM/PDM connections (e.g., as discussed above with reference to the I2S/TDM/PDM transceiver 127 of the node transceiver 120), and to the sensor 1 via an I2C connection (e.g., as discussed above with reference to the I2C transceiver 129 of the node transceiver 120). In some embodiments, the audio amplifier 1602 may be a peripheral device 108, regardless of whether or not it is included in a common housing with the node transceiver 120.

Figure 17:
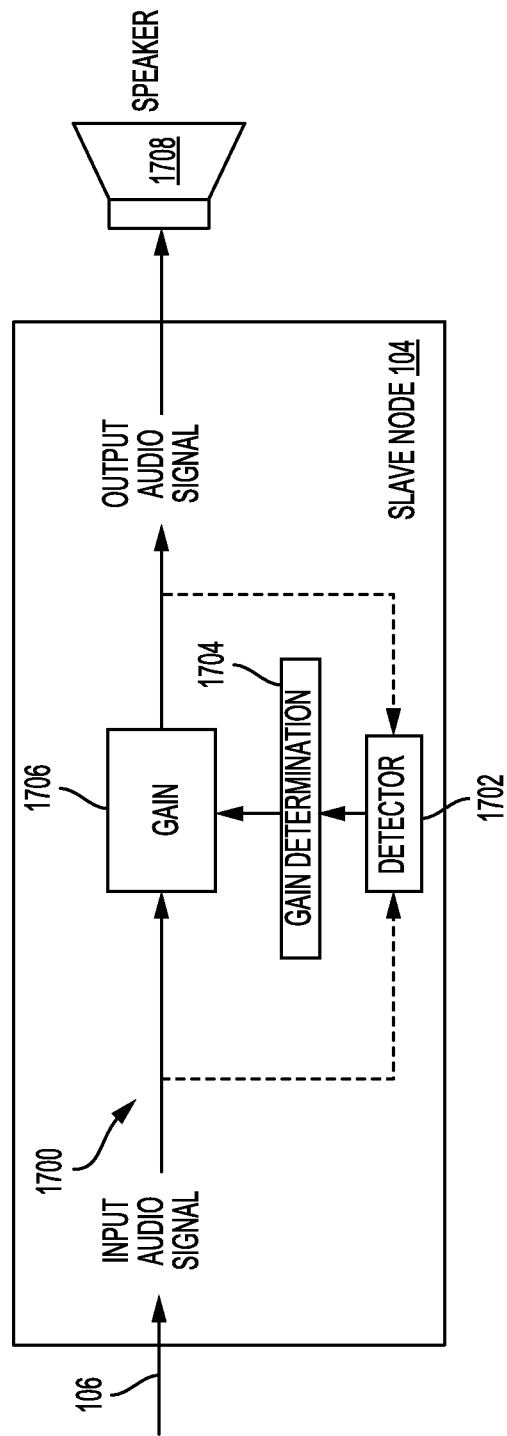
FIG. 17 is a block diagram of dynamics processor (DP) circuitry that may be included in a slave node, in accordance with various embodiments.

FIG. 17 is a block diagram of dynamics processor (DP) circuitry 1700 that may be included in a slave node 104, in accordance with various embodiments. In particular, FIG. 17 illustrates a slave node 104, coupled to a speaker 1708 (e.g., as a peripheral device 108). The slave node 104 may use audio data provided over the bus 106 to generate an input audio signal for provision to the DP circuitry 1700. As used herein, "dynamics processor circuitry" or "DP circuitry" may refer to circuitry that receives an input audio signal and processes that input audio signal based on its frequency content and/or level to generate an output audio signal. For example, DP circuitry may include compressor circuitry, limiter circuitry, expander circuitry, and/or gate circuitry, among other types of processing circuitry. In some embodiments, the input audio signal may be a digital signal, and the DP circuitry 1700 may output a digital audio signal that can be converted into analog form (e.g., by a DAC in the speaker 1708 or the slave node 104) and output by the speaker 1708. Note that FIG. 17 shows two pathways to detector circuitry 1702: a "feedforward" pathway from the input audio signal and a "feedback" pathway from the output audio signal. As known in the art, DP circuitry may include one or the other pathway; for ease of illustration, the feedforward pathway embodiment may be discussed principally herein.

The DP circuitry 1700 may include detector circuitry 1702, gain determination circuitry 1704, and gain circuitry 1706. The detector circuitry 1702 may detect any relevant properties of the input audio signal that may be used by the gain determination circuitry 1704 in order to determine a gain to be applied to the input audio signal. Examples of such properties, such as level and frequency, are discussed in detail below. The gain determination circuitry 1704 may use the properties detected by the detector circuitry 1702 to determine a gain to be applied to the input audio signal in accordance with a set of DP parameters, discussed below. The gain determination circuitry 1704 may provide the determined gain to the gain circuitry 1706, which may apply the determined gain to the input audio signal to generate the output audio signal. Other processing operations may be applied to an input audio signal to generate the ultimate analog output provided to the speaker 1708, as known in the art, but these are omitted from FIG. 17 for ease of illustration.

As noted above, the DP circuitry 1700 may include circuitry for performing any of a number of DP operations, such as compression, limiting, expansion, and gating. Compressor circuitry may reduce the dynamic range of an input signal by decreasing the level of the "loudest" portions of the input signal. In some embodiments, compressor circuitry parameters include a fixed or tunable compression threshold and a fixed or tunable compression ratio; when a level of the input signal exceeds the compression threshold, the compressor circuitry reduces the level of the signal by an amount governed by the compression ratio. For example, when the compression threshold is 80 dB, the compression ratio is 2, and the input audio signal has a level of 90 dB, the compressor circuitry may alter the input audio signal to output an audio signal having a level of 85 dB (80 dB+(90 dB−80 dB)/2). In some embodiments, the compression threshold and compression ratio of compressor circuitry may be frequency dependent, while in other embodiments, the compression threshold and compression ratio of compressor circuitry may be frequency independent (or "broadband"). Compressor circuitry may also include other fixed or tunable parameters, such as make-up gain, attack, release, knee, or other parameters known in the art.

Figure 18:
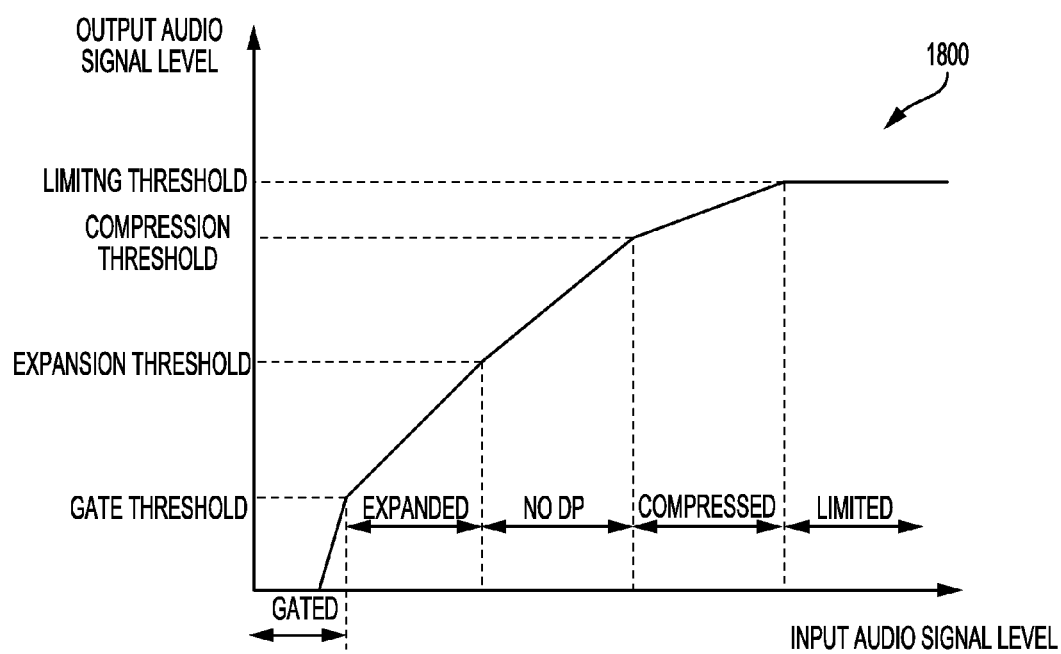
FIG. 18 is a plot illustrating the effect of various DP parameters of DP circuitry on an input audio signal level, in accordance with various embodiments.

FIG. 18 is a plot 1800 illustrating the effect of various DP parameters of DP circuitry on an input audio signal level, in accordance with various embodiments; in FIG. 18, a compressed region of the input audio signal level is shown for input audio signals having a level that exceeds a compression threshold. A "no DP" region of the input audio signal level is also shown in FIG. 18, indicating a region of input audio signal level in which the output audio signal level matches the input audio signal level.

Limiter circuitry may reduce the level of an input signal so that the output signal does not exceed a fixed or tunable limiting threshold. Operationally, limiter circuitry may be viewed as compressor circuitry with the compression threshold set equal to the limiting threshold and an infinite compression ratio. In FIG. 18, a limited region of the input audio signal level is shown for input audio signals having a level that exceeds a limiting threshold.

Expander circuitry may increase the dynamic range of an input signal by decreasing the level of the "quietest" portions of the input signal. In some embodiments, expander circuitry parameters include a fixed or tunable expansion threshold and a fixed or tunable expansion ratio; when a level of the input signal is below the expansion threshold, the expansion circuitry reduces the level of the signal by an amount governed by the expansion ratio. For example, when the expansion threshold is 10 dB, the expansion ratio is 2, and the input audio signal has a level of 8 dB, the expander circuitry may alter the input audio signal to output an audio signal having a level of 6 dB (10 dB−(10 dB−8 dB)*2). In some embodiments, the expansion threshold and expansion ratio of expander circuitry may be frequency dependent, while in other embodiments, the expansion threshold and expansion ratio of expander circuitry may be frequency independent. Expander circuitry may also include other fixed or tunable parameters, such as hold, depth, or other parameters known in the art. In FIG. 18, and expanded region of the input audio signal level is shown for input audio signals having a level that does not exceed an expansion threshold.

Gate circuitry may reduce the level of an input signal to zero when the input signal is below a gate threshold. Operationally, gate circuitry may be viewed as expander circuitry with the expansion threshold set equal to the gate threshold and an infinite expansion ratio. In FIG. 18, a gated region of the input audio signal level is shown for input audio signals having a level that does not exceed a gate threshold.

In a distributed audio setting in which multiple speakers are positioned around a listener, distortion and/or audio imaging imbalance may occur when different speakers utilize different DP parameters in an asymmetric manner. As used herein, "audio imaging" may refer to the phenomenon in which a listener to a recording played back by an audio system is able to reconstruct the spatial arrangement of sound sources present when the recording was made. Audio imaging imbalances may occur when a listener is not centered between a pair of stereo speakers, when the audio outputs from multiple speakers reach the listener's ears out of sync, when the audio outputs are not at matching levels when the audio reaches the listener's ears, and/or as a result of volume differences between different speakers, among others. For example, if a listener is centered between left and right speakers, and the left speaker uses a different expansion ratio than the right speaker, the audio heard by the listener may be distorted when the audio signal level is in the expanded range.

As noted above, distortion may also occur as a result of volume differences among different speakers. As used herein, the term "volume" may refer to the perceived loudness of a sound as measured on a relative scale. Audio systems may use any desired volume scale; for example, one audio system may use a volume scale from 0 to 10, while another audio system may use a volume scale from 1 to 100. Different audio devices may interpret these volume settings differently, and thus may react non-uniformly as a volume setting is increased or decreased. This may be particularly true in distributed audio settings, in which different amplifiers and speakers operate semi-independently from a central audio source. Moreover, the relationship between volume and amplifier power is typically nonlinear and will vary for each amplifier, speaker, and environment in which the amplifier and speaker are used. As used herein, a "volume-power curve" for an audio device may refer to the relationship between the volume output and the power output for that audio device. In conventional audio systems, one audio device may reach its maximum power output before the volume has been set to its maximum setting; this audio device may not be able to increase its output power if the volume is increased, while another audio device may be able to continue to increase its output power, resulting in distortion and audio imbalance.

Figure 19:
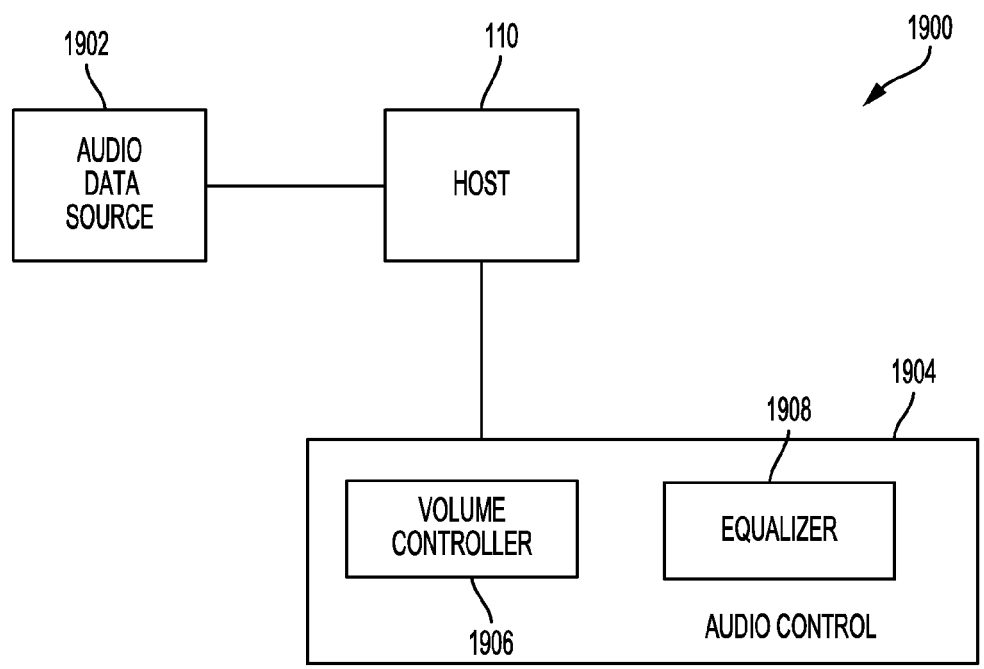
FIG. 19 is a block diagram illustrating a host coupled to an audio data source and audio control circuitry, in accordance with various embodiments.

FIG. 19 is a block diagram illustrating an arrangement 1900 having a host 110 coupled to an audio data source 1902 and audio control circuitry 1904, in accordance with various embodiments. The audio data source 1902 may be any source of digital or analog audio data provided to the host 110 for distribution through an audio system coupled to the bus 106 (not shown). In some embodiments, the audio data source 1902 may include a wireless transceiver for receiving streamed or downloaded audio data from a remote source. For example, the audio data source 1902 may include an AM or FM radio receiver, a long-range communication transceiver, a short-range communication transceiver, etc. In one particular example, the audio data source 1902 may be a mobile device or other computing device of a listener, and the audio data source 1902 may transmit audio data using Bluetooth or another short-range wireless communication protocol to the host 110. In some embodiments, the audio data source 1902 may read a physical medium on which audio data is written; for example, the audio data source 1902 may be a cassette player, a record player, a compact disc (CD) player, or a digital versatile disk (DVD) player.

The audio control circuitry may include a volume controller 1906, which may include one or more user interface elements (e.g., knobs, touchscreen displays, etc.) for receiving a user input of a current volume setting (e.g., a volume currently desired by the user for the audio system). The volume controller 1906 may have a maximum volume setting, corresponding to a maximum volume selectable by a user (e.g., 100 if the user can adjust the volume between 0 and 100). Analogously, the volume controller 1906 may have a minimum volume setting, corresponding to a minimum volume selectable by a user (e.g., 0 if the user can adjust the volume between 0 and 100). The volume controller 1906 may be configured to provide the maximum volume setting and the current volume setting to the host 110 (e.g., via an I2C interface or any other connection). The discussion of volume settings in this disclosure may focus on the maximum volume setting for ease of illustration (assuming that the minimum volume setting is uniform at zero across all audio devices in an audio system), but all of the teachings herein relative to the use of a maximum volume setting may be applied analogously to a minimum volume setting. The audio control circuitry 1904 may also include equalizer circuitry 1908. The equalizer circuitry 1908 may include one or more user interface elements (e.g., knobs, touchscreen displays, etc.) for receiving a user input of a balance between different frequency components desired in the audio output by the audio system. The equalizer circuitry 1908 may provide user settings for different frequency components (e.g., bass, treble, etc.) to the host 110 (e.g., via an I2C interface or any other connection). In some embodiments, user settings in the equalizer circuitry 1908 may be provided to the DP circuitry 1700 for use in setting DP parameters. Equalizer circuitry and volume controllers are known in the art, and thus are not discussed in further detail herein.

Figure 20:
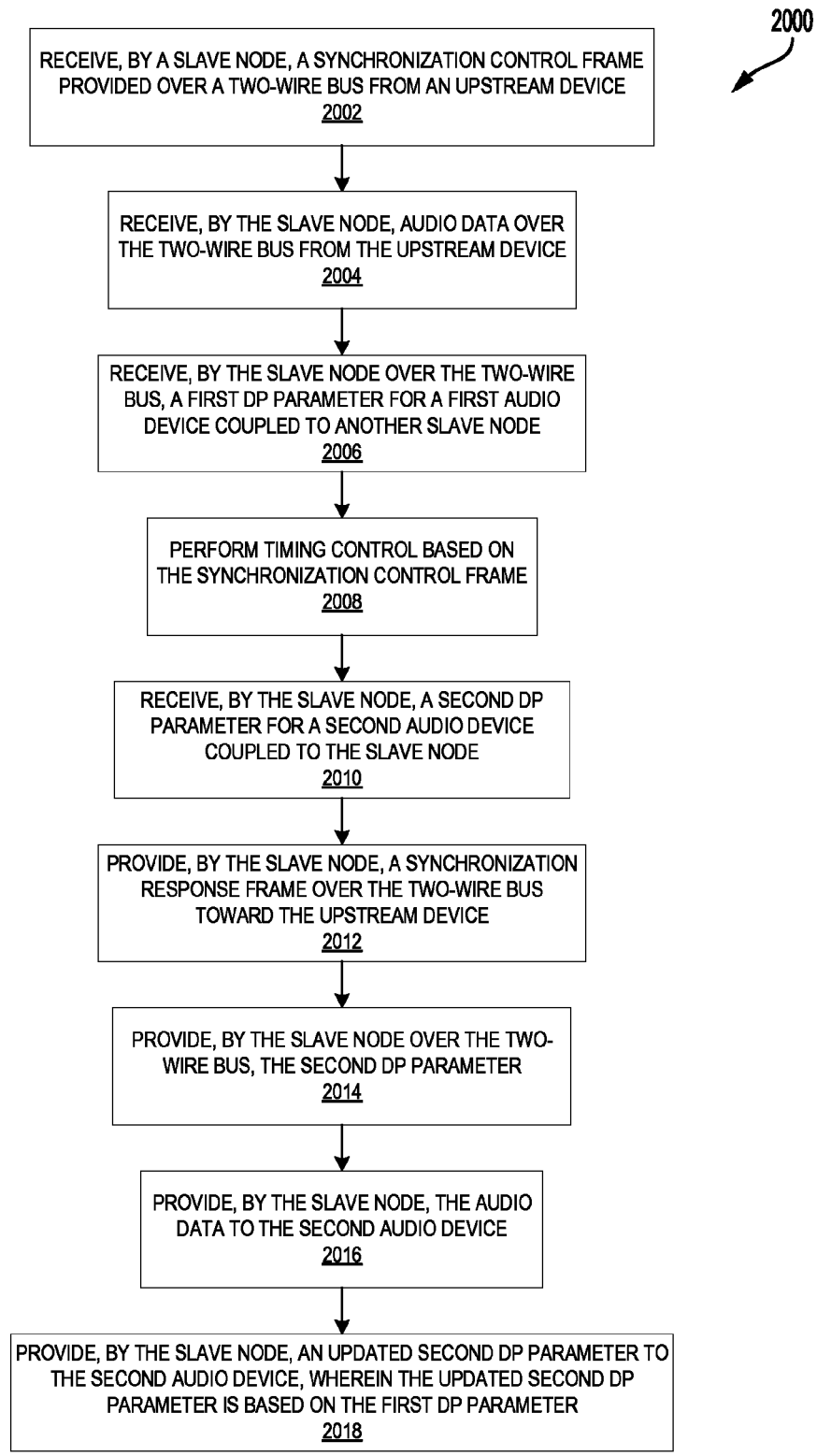
FIG. 20 is a flow diagram of a method for distributed audio coordination by a slave node, in accordance with various embodiments.

FIG. 20 is a flow diagram of a method 2000 for distributed audio coordination by a slave node, in accordance with various embodiments. While the operations of the method 2000 (and the other methods disclosed herein) are arranged in a particular order in the figures, and illustrated once each, in various embodiments, one or more of the operations may be repeated, omitted, or performed out of order. In particular, various operations of the method 2000 (any other methods disclosed herein), although illustrated as performed in a particular sequence for the sake of illustration, may be performed in parallel as suitable. In the discussion below, operations of the method 2000 (and the other methods disclosed herein) may be described as performed by the slave node 1 of the system 100 of FIG. 14 for illustrative purposes, but the operations of the method 2000 (and the other methods disclosed herein), including individual operation of the method 2000, may be performed by any suitably configured device (e.g., any suitable ones of the other slave nodes 104 of FIG. 14) using the two-wire bus communication techniques disclosed herein. In particular, any of the operations of the method 2000 (and the other methods disclosed herein) may be performed in accordance with any of the embodiments of the system 100 disclosed herein.

At 2002, a slave node 104 (e.g., the slave node 1 of FIG. 14) may receive a synchronization control frame 180. The synchronization control frame 180 may be provided to the slave node 104 over a two-wire bus 106 from an upstream node (e.g., the master node 102 or an upstream slave node 104). In some embodiments, the slave node 104 may receive the synchronization control frame 180 via the upstream DS transceiver 122 of the node transceiver 120. The synchronization control frame 180 received at 2002 may be structured in accordance with any of the embodiments described herein.

At 2004, the slave node 104 (e.g., the slave node 1 of FIG. 14) may receive audio data. The audio data may be provided to the slave node 104 over the two-wire bus 106 from the upstream node discussed above with reference to 2002. In some embodiments, the slave node 104 may receive audio data at 2004 subsequent to receiving the synchronization control frame 180 at 2002. In some embodiments, the slave node 104 may receive the audio data via the upstream DS transceiver 122 of the node transceiver 120. In particular, the audio data may be included in the downstream data slots 198 of a superframe 190, as discussed above with reference to FIG. 4. The audio data may be encoded using any desired format (e.g., sampled at 44.1 or 48 kHz). In some embodiments, the audio data may originate in the system 100 at the host 110, and may be audio data streamed wirelessly to the host 110 or read from a computer readable medium, such as a CD or DVD (e.g., as discussed above with reference to the audio data source 1902).

At 2006, the slave node 104 (e.g., the slave node 1 of FIG. 14) may receive, over the bus 106, a first DP parameter for a first audio device coupled to another slave node 104 (e.g., the slave node 6 of FIG. 14). Although the term "DP parameter" may be referred to in the singular, one or more DP parameters may be received by the slave node 104 at 2006. In some embodiments, another slave node 104 may be upstream of the slave node 104, and the another slave node 104 may insert the first DP parameter into downstream data that follows the synchronization control frame 180 for receipt by the slave node 104 at 2006. In some such embodiments, the first DP parameter may not be received by the master node 102. In some embodiments, another slave node 104 may be downstream of the slave node 104, and another slave node 104 may insert the first DP parameter into upstream data that follows a synchronization response frame 197 for receipt by the slave node 104 at 2006. In some embodiments, the first DP parameter may be communicated to the slave node 104 at 2006 in a synchronization response frame, in a synchronization control frame, via GPIO pins, or using any other suitable communication pathway in the system 100.

The first DP parameter received at 2006 may be any suitable DP parameter, such as any of the DP parameters discussed herein. For example, the first DP parameter may be a compressor circuitry parameter (e.g., a compression threshold or a compression ratio), a limiter circuitry parameter (e.g., a limiting threshold or a limiting ratio), an expansion circuitry parameter (e.g., an expansion threshold or an expansion ratio), or a gate circuitry parameter (e.g., a gate threshold or a gating ratio). As discussed above, in some embodiments, a DP parameter may be frequency dependent, and thus the first DP parameter received at 2006 may include frequency-dependent information.

At 2008, the slave node 104 (e.g., the slave node 1 of FIG. 14) may perform timing control based on the synchronization control frame 180 received at 2002. In some embodiments, the slave node 104 may derive timing information from the synchronization control frame 180 received at 2002. In some embodiments, as discussed above with reference to FIG. 3, a preamble 182 may be used to recover a clock signal that can be locked by the PLL 128 of the node transceiver 120. In some embodiments, the upstream DS transceiver 122 and/or the PLL 128 of the node transceiver 120 may perform the timing control at 2008.

At 2010, the slave node 104 (e.g., the slave node 1 of FIG. 14) may receive a second DP parameter for a second audio device coupled to the slave node 104 (e.g., the speaker 11 or the speaker 12 of FIG. 14). The second DP parameter may be provided to the slave node 104 by a sensor (e.g., the sensor 1 of FIG. 14) or the second audio device itself coupled to the slave node 104 as a peripheral device 108. In some embodiments, the I2C transceiver 129 may receive the second DP parameter at 2010.

At 2012, the slave node 104 (e.g., the slave node 1 of FIG. 14) may provide a synchronization response frame 197 over the two-wire bus 106 toward an upstream node (e.g., the master node 102 or an upstream slave node 104). In some embodiments, the slave node 104 may provide the synchronization response frame 197 via the upstream DS transceiver 122 of the node transceiver 120. The timing of the provision of the synchronization response frame at 2012 may be based on the timing control performed at 2008; in particular, the slave node 104 may time the provision of the synchronization response frame at 2012 using a clock based on the synchronization control frame 180. The synchronization response frame 197 provided at 2012 may be structured in accordance with any of the embodiments described herein.

At 2014, the slave node 104 (e.g., the slave node 1 of FIG. 14) may provide the second DP parameter for the second audio device (discussed above with reference to 2010) over the bus 106 toward an upstream node (e.g., the master node 102 or an upstream slave node 104). In some embodiments, the slave node 104 may provide the second DP parameter via the upstream DS transceiver 122 of the node transceiver 120. In particular, the second DP parameter may be included in the upstream data slots 199 of a superframe 190, as discussed above with reference to FIG. 4. The slave node 104 may provide the second DP parameter at 2014 subsequent to providing the synchronization response frame 197 at 2012. In some embodiments, the second DP parameter may be transmitted through the system 100 to the host 110. In some embodiments, the second DP parameter may be communicated toward the upstream node at 2014 in a synchronization response frame, via GPIO pins, or using any other suitable communication pathway in the system 100.

In some embodiments, the second DP parameter received at 2010 may be encoded using a first encoding scheme, and the second DP parameter provided at 2014 may be encoded using a second, different encoding scheme. For example, the second audio device coupled to the slave node 104 may provide the second DP parameter at 2010 using a specific format over an I2C bus, while the slave node 104 may provide the second DP parameter to the bus 106 in accordance with the encoding techniques discussed herein and in any desired format (e.g., in some embodiments, a format that is readily parsed by another node or the host 110 upon receipt of the second DP parameter). In some embodiments, the second DP parameter of 2010 may be a "raw" or minimally processed DP parameter from the second audio device, while the second DP parameter of 2014 may represent the second DP parameter in a more processed form. For example, the second DP parameter of 2014 may represent an averaged or otherwise filtered version of the second DP parameter of 2010. Processing performed on the second DP parameter of 2010 to generate the second DP parameter of 2014 may be performed by the processing device 1302 and/or the node transceiver 120. In some embodiments, the second DP parameter of 2010 may be identical to the second DP parameter of 2014.

At 2016, the slave node 104 (e.g., the slave node 1 of FIG. 14) may provide the audio data received at 2004 to the second audio device (e.g., the speaker 11 or the speaker 12 of FIG. 14). The second audio device may be coupled to the slave node 104 as a peripheral device 108. In some embodiments, the I2S/TDM/PDM transceiver 127 may provide the audio data to the second audio device at 2016. The second audio device may output audio in response to receipt of the audio data. In some embodiments, the second audio device may include an amplifier and/or a speaker. For example, the slave node 104 may be a distributed amplifier device (as illustrated in FIG. 16) and may include an audio amplifier 1602 and one or more speakers. In some embodiments, the operations discussed with reference to 2008 and 2016 may be performed at least partially in parallel.

At 2018, the slave node 104 (e.g., the slave node 1 of FIG. 14) may provide an updated second DP parameter to the second audio device (e.g., the speaker 11 or the speaker 12 of FIG. 14). The second audio device may change its second DP parameter to match the updated second DP parameter in response to receipt of the updated second DP parameter, and thereby adjust its output of audio. The updated second DP parameter of 2018 may be based on the first DP parameter. That is, a DP parameter of the second audio device may be updated based on the DP parameter of a first audio device.

In some embodiments, the updated second DP parameter may be selected to match the first DP parameter (e.g., in order to match the DP operations performed by two different audio devices). In some embodiments, the updated second DP parameter may be selected to mitigate a fault or other condition at the first audio device. For example, in some embodiments, the first DP parameter may be a change in a DP parameter that the first audio device will make or has made to mitigate an overdrive condition at the first audio device. One particular example of such a scenario may occur if the current limiting threshold for the first audio device is too high to avoid the first audio device going into overdrive; upon detection of this scenario, the first audio device may decrease its limiting threshold to avoid overdrive and may signal this decrease in the limiting threshold to the second audio device via the bus 106 as discussed above. In response, the second audio device may decrease its own limiting threshold to match and thereby avoid distortion.

In some embodiments of FIG. 20, the host 110 may not receive or transmit any DP parameter information or generate any control instructions to update DP parameters. Instead, the movement of DP parameter information and the generation of control instructions may be managed by the slave nodes 104. For example, a processing device 1302 (e.g., a DSP) in a slave node 104 that receives a DP parameter of an audio device coupled to another slave node may determine how to update the DP parameter of its own audio device in response. These embodiments may represent a "distributed" form of control over a distributed audio system.

In other embodiments of FIG. 20, the host 110 may receive DP parameter information and may generate control instructions to update DP parameters (which may then be transmitted to the bus 106 via the master node 102). These embodiments may represent a "centralized" form of control over a distributed audio system, examples of which are discussed below with reference to FIG. 21.

Figure 21:
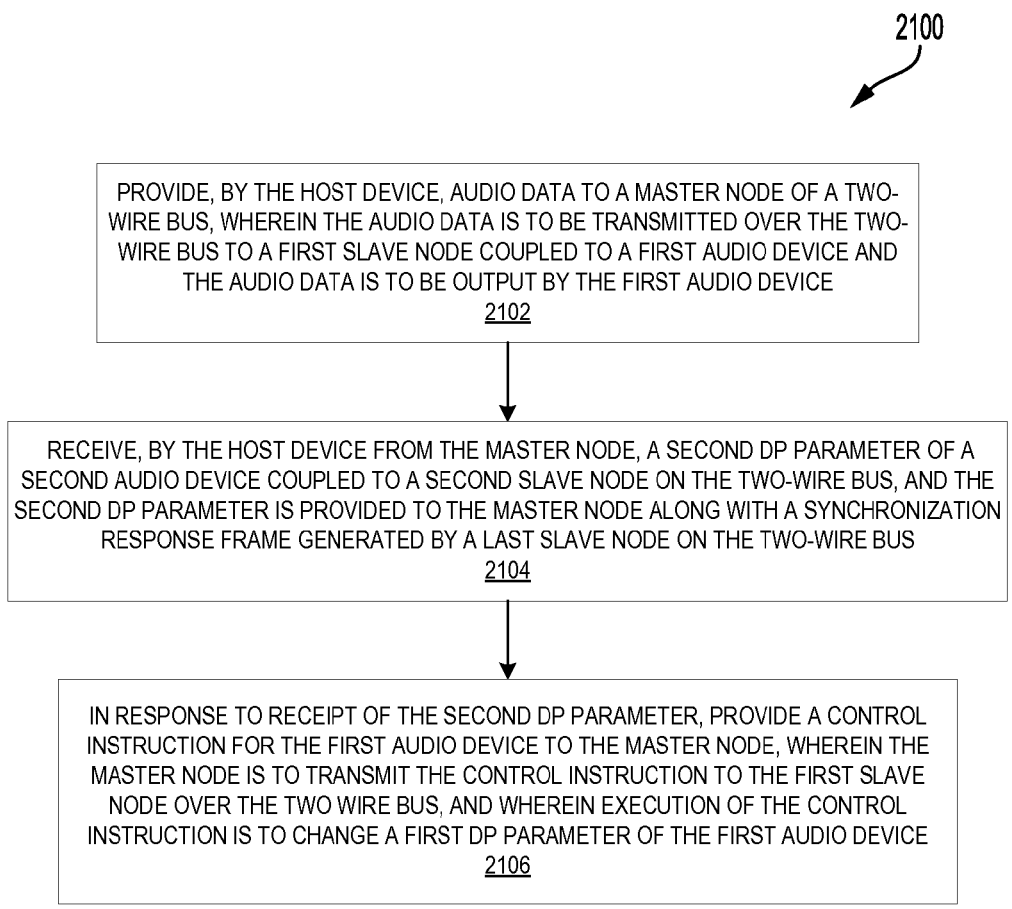
FIG. 21 is a flow diagram of a method for distributed audio coordination by a host, in accordance with various embodiments.

FIG. 21 is a flow diagram of a method 2100 for distributed audio coordination by a host, in accordance with various embodiments. In the discussion below, operations of the method 2100 may be described as performed by the host 110 of the system 100 of FIG. 14 for illustrative purposes, but the operations of the method 2100, including individual operation of the method 2100, may be performed by any suitably configured device (using the two-wire bus communication techniques disclosed herein). In particular, any of the operations of the method 2100 may be performed in accordance with any of the embodiments of the system 100 disclosed herein.

At 2102, the host 110 may provide audio data to the master node 102 for provision along the bus 106 to a first slave node 104 (e.g., the slave node 1 of FIG. 14). Upon receipt by the first slave node 104, the audio data is to be output by a first audio device (e.g., the speaker 11 of FIG. 14) coupled to the first slave node 104 (e.g., as a peripheral device 108). In some embodiments, the host 110 may provide the audio data to the master node 102 at 2102 via an I2S/TDM bus (using an I2S/TDM transceiver included in the host 110), and the master node 102 may receive the audio data via the I2S/TDM/PDM transceiver 127. The master node 102 may provide the audio data to the bus 106 in the downstream data slots 198 of a superframe 190, and the audio data may pass through any intervening slave nodes 104 between the master node 102 and the first slave node 104. The audio data may be encoded using any desired format (e.g., sampled at 44.1 or 48 kHz). In some embodiments, the audio data may be streamed wirelessly to the host 110 or read from a computer readable medium, such as a CD or DVD, prior to the host 110 providing the audio data to the master node 102 at 2102 (e.g., as discussed above with reference to the audio data source 1902). The audio data provided by the host 110 at 2102 may be provided to multiple slave nodes 104, each of which may be coupled to an audio device configured to output the audio data upon receipt.

At 2104, the host 110 may receive, via the bus 106 and the master node 102, a second DP parameter of a second audio device coupled to a second slave node 104 on the bus 106. The second slave node 104 of 2104 may be different from the first slave node 104 of 2102. In some embodiments, the host 110 may receive the second DP parameter via an I2C bus between the host 110 and the master node 102 (e.g., using an I2C transceiver included in the host 110). For example, the master node 102 may provide the second DP parameter to the host 110 using the I2C transceiver 129. The second DP parameter may take the form of any of the embodiments of DP parameters discussed above with reference to 2006 of FIG. 20. The second DP parameter may be provided to the master node 102 via the bus 106 along with a synchronization response frame 197. The synchronization response frame 197 may be generated by a last slave node 104 on the bus 106 (e.g., the slave node 7 of FIG. 14). For example, the second DP parameter may be provided to the master node 102 in the upstream data slots 199 of a superframe 190, as discussed above with reference to FIG. 4. In some embodiments, the second DP parameter may be communicated to the master node 102 and/or the host 110 in a synchronization response frame, via GPIO pins, or using any other suitable communication pathway in the system 100.

At 2106, the host 110 may provide a control instruction for the first audio device to the master node 102 for transmission downstream over the bus 106. In particular, the master node 102 may transmit the control instruction to the first slave node 104 over the bus 106 (e.g., in a synchronization control frame, in data following a synchronization control frame, or via a GPIO pin). The host 110 may generate the control instruction based on the second DP parameter of 2104, and, in some embodiments, execution of the control instruction by the first audio device or its associated first slave node 104 may change a first DP parameter of the audio device. The control instruction provided at 2106 may result in any of the DP parameter changes discussed above with reference to 2018 of FIG. 20. For example, in some embodiments, the first DP parameter may be a compression threshold, and the updated first DP parameter may have a lower value for the compression threshold than the first DP parameter. In some embodiments, the operations discussed above with reference to 2106 may not be performed; instead, the method may end with the operations discussed above with reference to 2104.

The method 2100 may include further operations. For example, the host 110 may include display interface circuitry (e.g., as discussed above with reference to the display device 1306 of FIG. 13) that is configured to provide a visual indicator of the DP parameters of audio devices to a display device 1306 in communication with the host 110.

Figure 22:
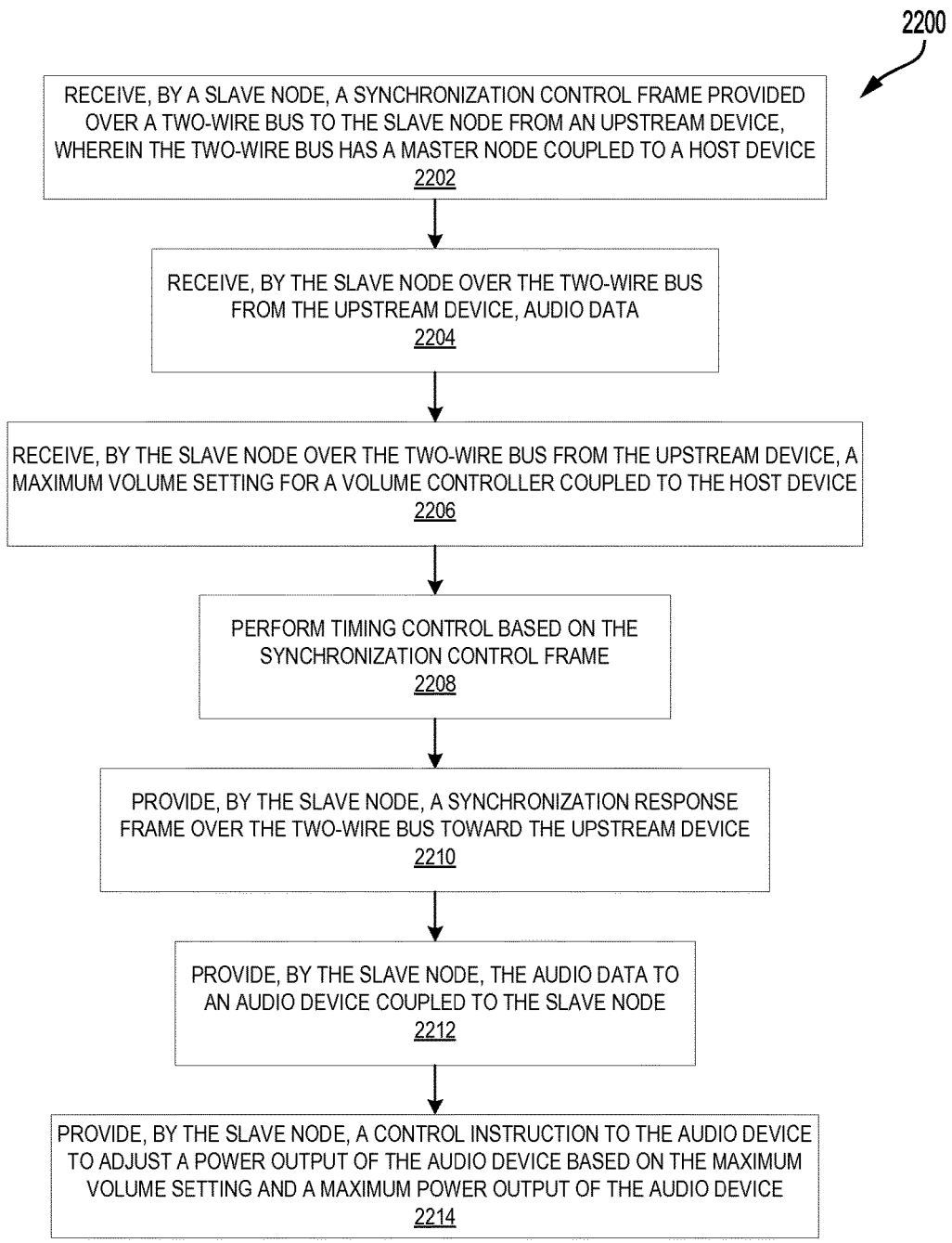
FIG. 22 is a flow diagram of another method for distributed audio coordination by a slave node, in accordance with various embodiments.

FIG. 22 is a flow diagram of a method 2200 for distributed audio coordination by a slave node, in accordance with various embodiments. In the discussion below, operations of the method 2200 may be described as performed by the slave node 1 of the system 100 of FIG. 14 (and with reference to other particular slave nodes and peripheral devices) for illustrative purposes, but the operations of the method 2200, including individual operation of the method 2200, may be performed by any suitably configured device (using the two-wire bus communication techniques disclosed herein). In particular, any of the operations of the method 2200 may be performed in accordance with any of the embodiments of the system 100 disclosed herein. In some embodiments, a slave node 104 may perform the method 2000 and the method 2200 in an integrated manner.

At 2202, a slave node 104 (e.g., the slave node 1 of FIG. 14) may receive a synchronization control frame 180. The synchronization control frame 180 may be provided to the slave node 104 over a two-wire bus 106 from an upstream node (e.g., the master node 102 or an upstream slave node 104). In some embodiments, the slave node 104 may receive the synchronization control frame 180 via the upstream DS transceiver 122 of the node transceiver 120. The synchronization control frame 180 received at 2202 may be structured in accordance with any of the embodiments described herein. The bus 106 may have a master node 102 coupled to a host 110, as discussed above.

At 2204, the slave node 104 (e.g., the slave node 1 of FIG. 14) may receive audio data. The audio data may be provided to the slave node 104 over the two-wire bus 106 from the upstream node discussed above with reference to 2202. In some embodiments, the slave node 104 may receive audio data at 2204 subsequent to receiving the synchronization control frame 180 at 2202. In some embodiments, the slave node 104 may receive the audio data via the upstream DS transceiver 122 of the node transceiver 120. In particular, the audio data may be included in the downstream data slots 198 of a superframe 190, as discussed above with reference to FIG. 4. The audio data may be encoded using any desired format (e.g., sampled at 44.1 or 48 kHz). In some embodiments, the audio data may originate in the system 100 at the host 110, and may be audio data streamed wirelessly to the host 110 or read from a computer readable medium, such as a CD or DVD (e.g., as discussed above with reference to the audio data source 1902).

At 2206, the slave node 104 (e.g., the slave node 1 of FIG. 14) may receive, over the bus 106, a maximum volume setting for a volume controller 1906 coupled to the host device 110. In some embodiments, the slave node 104 may receive the audio data at 2204 and the maximum volume setting at 2206 in different superframes 190. In such embodiments, the slave node 104 may receive a synchronization control frame between receipt of the audio data at 2204 and receipt of the maximum volume setting at 2206. In other embodiments, the slave node 104 may receive the audio data at 2204 and the maximum volume setting at 2206 in a common superframe 190.

At 2208, the slave node 104 (e.g., the slave node 1 of FIG. 14) may perform timing control based on the synchronization control frame 180 received at 2202. In some embodiments, the slave node 104 may derive timing information from the synchronization control frame 180 received at 2202. In some embodiments, as discussed above with reference to FIG. 3, a preamble 182 may be used to recover a clock signal that can be locked by the PLL 128 of the node transceiver 120. In some embodiments, the upstream DS transceiver 122 and/or the PLL 128 of the transceiver 120 may perform the timing control at 2208.

At 2210, the slave node 104 (e.g., the slave node 1 of FIG. 14) may provide a synchronization response frame 197 over the two-wire bus 106 toward an upstream node (e.g., the master node 102 or an upstream slave node 104). In some embodiments, the slave node 104 may provide the synchronization response frame 197 via the upstream DS transceiver 122 of the node transceiver 120. The timing of the provision of the synchronization response frame at 2210 may be based on the timing control performed at 2208; in particular, the slave node 104 may time the provision of the synchronization response frame at 2210 using a clock based on the synchronization control frame 180. The synchronization response frame 197 provided at 2210 may be structured in accordance with any of the embodiments described herein.

At 2212, the slave node 104 (e.g., the slave node 1 of FIG. 14) may provide the audio data received at 2204 to an audio device coupled to the slave node 104 (e.g., the speaker 11 or the speaker 12 of FIG. 14). The audio device may be coupled to the slave node 104 as a peripheral device 108. In some embodiments, the I2S/TDM/PDM transceiver 127 may provide the audio data to the audio device at 2212. The audio device may output audio in response to receipt of the audio data. In some embodiments, the second audio device may include an amplifier and/or a speaker. For example, the slave node 104 may be a distributed amplifier device (as illustrated in FIG. 16) and may include an audio amplifier 1602 and one or more speakers. In some embodiments, the operations discussed with reference to 2208 and 2216 may be performed at least partially in parallel.

At 2214, the slave node 104 (e.g., the slave node 1 of FIG. 14) may provide a control instruction to the audio device to adjust a power output of the audio device based on the maximum volume setting and a maximum power output of the audio device. For example, the slave node 104 may provide a control instruction to the audio device such that the audio device does not reach its maximum power output prior to the volume controller 1906 reaching its maximum volume setting. This may prevent the audio device from reaching its maximum power output and "saturating" while other audio devices in the audio system continue to increase their power output as the user increases the volume setting.

In some embodiments, the slave node 104 (e.g., the slave node 1 of FIG. 14) may receive, over the bus 106, a current volume setting for the volume controller 1906 (e.g., in a synchronization control frame, in data following a synchronization control frame, or via GPIO pins). In some embodiments, the slave node 104 may receive the audio data at 2204, the maximum volume setting at 2206, and the current volume setting in different superframes 190, while in other embodiments, the slave node 104 may receive the audio data at 2204 and/or the maximum volume setting at 2206 in a common superframe 190. In embodiments in which the slave node 104 receive the current volume setting, the control instruction provided by the slave node 104 at 2214 may include instruction to adjust the power output of the audio device to an adjusted level according to a volume-power curve for the audio device in which the maximum volume setting corresponds to the maximum power output. In other words, the power output of the audio device may be adjusted so that, as the current volume setting increases to the maximum volume setting, the power output of the audio device can continue to increase along the volume-power curve to the maximum power output.

The following paragraphs provide examples of various ones of the embodiments disclosed herein.

Example 1 is a slave device for two-wire low latency distributed audio coordination, including: first circuitry to receive a synchronization control frame provided over a two-wire bus to the slave device from an upstream device, subsequent to receipt of the synchronization control frame, receive, over the two-wire bus from the upstream device, audio data, receive, over the two-wire bus, a first dynamics processor (DP) parameter for a first audio device coupled to another slave device, provide a synchronization response frame over the two-wire bus toward the upstream device, and provide (e.g., subsequent to provision of the synchronization response frame), over the two-wire bus toward the upstream device, a second DP parameter for a second audio device coupled to the slave device; second circuitry to derive timing information from the synchronization control frame, wherein the timing information is used to time the provision of the synchronization response frame; and third circuitry to provide the audio data to the second audio device, receive, from the second audio device, the second DP parameter; and provide an updated second DP parameter to the second audio device, wherein the updated second DP parameter is based on the first DP parameter.

Example 2 may include the subject matter of Example 1, and may further specify that the another slave device is upstream of the slave device on the two-wire bus, and the another slave device inserts the first DP parameter into downstream data that follows the synchronization control frame for receipt by the slave device.

Example 3 may include the subject matter of Example 2, and may further specify that the first DP parameter is not received by a master device of the two-wire bus.

Example 4 may include the subject matter of Example 1, and may further specify that the another slave device is downstream of the slave device on the two-wire bus, and the another slave device inserts the first DP parameter into upstream data that follows a synchronization response frame for receipt by the slave device.

Example 5 may include the subject matter of any of Examples 1-4, and may further specify that the third circuitry includes an I2C transceiver for receipt of the second DP parameter.

Example 6 may include the subject matter of any of Examples 1-5, and may further specify that the third circuitry includes an I2S transceiver for provision of the audio data.

Example 7 may include the subject matter of any of Examples 1-6, and may further specify that the first DP parameter includes a compressor circuitry parameter.

Example 8 may include the subject matter of any of Examples 1-7, and may further specify that the first, second, and third circuitry are included in a common housing with an audio amplifier.

Example 9 may include the subject matter of any of Examples 1-8, and may further specify that the first circuitry is to receive, over the two-wire bus, a maximum volume setting for a volume controller coupled to a host device; and the third circuitry is to provide a control instruction to the second audio device to adjust a power output of the second audio device based on the maximum volume setting and a maximum power output of the second audio device.

Example 10 is a host device for two-wire low latency distributed audio coordination, including: first circuitry to provide audio data to a master device, wherein the master device is a master of a half-duplex two-wire bus, the audio data is to be provided over the two-wire bus to a first slave device, and the audio data is to be output by a first audio device coupled to the first slave device; and second circuitry to: receive, from the master device, a dynamics processor (DP) parameter, wherein the DP parameter is a DP parameter of a second audio device coupled to a second slave device on the two-wire bus, the second slave device is different from the first slave device, and the DP parameter is provided to the master device over the two-wire bus by the second slave device along with a synchronization response frame generated by a last slave device on the two-wire bus, and provide the DP parameter to the master device for provision over the two-wire bus to the first slave device.

Example 11 may include the subject matter of Example 10, and may further specify that the first circuitry includes an I2S transceiver.

Example 12 may include the subject matter of any of Examples 10-11, and may further specify that the second circuitry includes an I2C transceiver.

Example 13 may include the subject matter of any of Examples 10-12, and may further specify that the DP parameter includes a change in a compressor circuitry parameter that the second audio device will make or has made to mitigate an overdrive condition.

Example 14 is one or more non-transitory computer readable media having instructions thereon that, in response to execution by one or more processing devices of an host device, cause the host device to: subsequent to provision by the host device of audio data to a master device of a two-wire bus, receive, from the master device, a first dynamics processor (DP) parameter of a first audio device coupled to a first slave device on the two-wire bus, wherein the audio data is to be transmitted over the two-wire bus to a second slave device coupled to a second audio device, the audio data is to be output by the second audio device, and the first DP parameter is provided to the master device along with a synchronization response frame generated by a last slave device on the two-wire bus; and in response to receipt of the first DP parameter, provide a control instruction for the second audio device to the master device, wherein the master device is to transmit the control instruction to the second slave device over the two-wire bus, and wherein execution of the control instruction is to change a second DP parameter of the second audio device.

Example 15 may include the subject matter of Example 14, and may further specify that the slave device is the last slave device.

Example 16 may include the subject matter of any of Examples 14-15, and may further specify that the first DP parameter includes a change in a compressor circuitry parameter that the first audio device will make or has made to mitigate an overdrive condition, and the control instruction is to cause a change in a compressor circuitry parameter of the second audio device.

Example 17 may include the subject matter of any of Examples 14-16, and may further specify that the host device is included in a vehicle head unit.

Example 18 may include the subject matter of any of Examples 14-17, and may further specify that execution of the instructions by the one or more processing devices further cause the host device to provide, to the master device, a maximum volume setting for a volume controller coupled to a host device, and wherein the maximum volume setting is to be transmitted over the two-wire bus to the second slave device.

Example 19 is a method for distributed audio coordination, including: providing, by a first slave device on a two-wire bus, a synchronization response frame over the two-wire bus towards an upstream device, wherein the first slave device is coupled to a first audio device; providing (e.g., subsequent to providing the synchronization response frame), by the first slave device over the two-wire bus towards the upstream device, a first dynamics processor (DP) parameter of the first audio device; receiving, by the first slave device, a synchronization control frame from the upstream device over the two-wire bus; recovering, by the first slave device, a clock signal from the synchronization control frame; receiving (e.g., subsequent to receiving the synchronization control frame), by the first slave device over the two-wire bus, a second DP parameter for a second audio device coupled to a second slave device different from the first slave device; and providing, by the first slave device to the first audio device, an updated first DP parameter to the first audio device, wherein the updated first DP parameter is based on the second DP parameter.

Example 20 may include the subject matter of Example 19, and may further include locking a phase locked loop based on the recovered clock signal.

Example 21 may include the subject matter of any of Examples 19-20, and may further specify that the first DP parameter includes a compression threshold and the updated first DP parameter has a lower value than the first DP parameter.

Example 22 may include the subject matter of any of Examples 19-21, and may further specify that the second slave device provides the second DP parameter to the two-wire bus in response to an overdrive condition of the second audio device.

Example 23 is a slave device for two-wire low latency distributed audio coordination, including: first circuitry to receive a synchronization control frame provided over a two-wire bus to the slave device from an upstream device, wherein the two-wire bus has a master device coupled to a host device, subsequent to receipt of the synchronization control frame, receive, over the two-wire bus from the upstream device, audio data and a maximum volume setting for a volume controller coupled to the host device, and subsequent to receipt of the audio data and the maximum volume setting, provide a synchronization response frame over the two-wire bus toward the upstream device; second circuitry to derive timing information from the synchronization control frame, wherein the timing information is used to time provision of a synchronization response frame, by the slave device, subsequent to receipt of the audio data and the maximum volume setting; third circuitry to provide the audio data to an audio device coupled to the slave device, and provide a control instruction to the audio device to adjust a power output of the audio device based on the maximum volume setting and a maximum power output of the audio device.

Example 24 may include the subject matter of Example 23, and may further specify that the synchronization control frame is a first synchronization control frame, and the first circuitry is further to receive a second synchronization control frame between receipt of the audio data and receipt of the maximum volume setting.

Example 25 may include the subject matter of any of Examples 23-24, and may further specify that the audio device includes an audio amplifier.

Example 26 may include the subject matter of any of Examples 23-25, and may further specify that the first circuitry is further to receive, over the two-wire bus from the upstream device, a current volume setting for a volume controller coupled to the host device.

Example 27 may include the subject matter of any of Examples 23-26, and may further specify that the control instruction includes an instruction to adjust the power output of the audio device to an adjusted level according to a volume-power curve for the audio device in which the maximum volume setting corresponds to the maximum power output.

Example 28 may include the subject matter of any of Examples 23-27, and may further specify that: the slave device is a first slave device; the audio device is a first audio device; the audio device has a first dynamics processor (DP) parameter; the first circuitry is further to receive, over the two-wire bus, a second DP parameter for a second audio device coupled to a second slave device on the two-wire bus; and the third circuitry is to provide an updated first DP parameter to the first audio device, wherein the updated first DP parameter is based on the second DP parameter.

Example 29 is a method for low latency distributed audio coordination, including: receiving, by a slave device, a synchronization control frame provided over a two-wire bus to the slave device from an upstream device, wherein the two-wire bus has a master device coupled to a host device; receiving (e.g., subsequent to receiving the synchronization control frame), by the slave device over the two-wire bus from the upstream device, a maximum volume setting for a volume controller coupled to the host device; subsequent to receiving the maximum volume setting, providing, by the slave device, a synchronization response frame over the two-wire bus toward the upstream device; deriving, by the slave device, timing information from the synchronization control frame, wherein the timing information is used to time provision of a synchronization response frame, by the slave device, subsequent to receiving the maximum volume setting; and providing, by the slave device, a control instruction to the audio device to adjust a power output of the audio device based on the maximum volume setting and a maximum power output of the audio device.

Example 30 may include the subject matter of Example 29, and may further include receiving, by the slave device over the two-wire bus from the upstream device, a current volume setting for the volume controller; wherein the control instruction includes an instruction to adjust the power output of the audio device to an adjusted level according to a volume-power curve for the audio device in which the maximum volume setting corresponds to the maximum power output.

Example 31 is a device including means for performing any of the methods disclosed herein.

Example 32 is one or more computer readable media having instructions thereon that, in response to execution by one or more processing devices of a device, cause the device to perform any of the methods disclosed herein.

What is claimed is:

1. A slave device for two-wire low latency distributed audio coordination, comprising:
   first circuitry to:
   receive a synchronization control frame provided over a two-wire bus to the slave device from an upstream device,
   subsequent to receipt of the synchronization control frame, receive, over the two-wire bus from the upstream device, audio data,
   receive, over the two-wire bus, a first dynamics processor (DP) parameter for a first audio device coupled to another slave device,
   provide a synchronization response frame over the two-wire bus toward the upstream device, and
   provide, over the two-wire bus toward the upstream device, a second DP parameter for a second audio device coupled to the slave device;
   second circuitry to derive timing information from the synchronization control frame, wherein the timing information is used to time the provision of the synchronization response frame; and third circuitry to:
provide the audio data to the second audio device,
receive, from the second audio device, the second DP parameter; and
provide an updated second DP parameter to the second audio device, wherein the updated second DP parameter is based on the first DP parameter.

2. The slave device of claim 1, wherein the another slave device is upstream of the slave device on the two-wire bus, and the another slave device inserts the first DP parameter into downstream data that follows the synchronization control frame for receipt by the slave device.

3. The slave device of claim 2, wherein the first DP parameter is not received by a master device of the two-wire bus.

4. The slave device of claim 1, wherein the another slave device is downstream of the slave device on the two-wire bus, and the another slave device inserts the first DP parameter into upstream data that follows a synchronization response frame for receipt by the slave device.

5. The slave device of claim 1, wherein the third circuitry includes an I2C transceiver for receipt of the second DP parameter.

6. The slave device of claim 1, wherein the third circuitry includes an I2S transceiver for provision of the audio data.

7. The slave device of claim 1, wherein the first DP parameter includes a compressor circuitry parameter.

8. The slave device of claim 1, wherein the first, second, and third circuitry are included in a common housing with an audio amplifier.

9. The slave device of claim 1, wherein:
the first circuitry is to receive, over the two-wire bus, a maximum volume setting for a volume controller coupled to a host device; and
the third circuitry is to provide a control instruction to the second audio device to adjust a power output of the second audio device based on the maximum volume setting and a maximum power output of the second audio device.

10. A host device for two-wire low latency distributed audio coordination, comprising:
first circuitry to provide audio data to a master device, wherein the master device is a master of a half-duplex two-wire bus, the audio data is to be provided over the two-wire bus to a first slave device, and the audio data is to be output by a first audio device coupled to the first slave device; and
second circuitry to:
receive, from the master device, a dynamics processor (DP) parameter, wherein the DP parameter is a DP parameter of a second audio device coupled to a second slave device on the two-wire bus, the second slave device is different from the first slave device, and the DP parameter is provided to the master device over the two-wire bus by the second slave device along with a synchronization response frame generated by a last slave device on the two-wire bus, and
provide the DP parameter to the master device for provision over the two-wire bus to the first slave device.

11. The host device of claim 10, wherein the first circuitry includes an I2S transceiver.

12. The host device of claim 10, wherein the second circuitry includes an I2C transceiver.

13. The host device of claim 10, wherein the DP parameter includes a change in a compressor circuitry parameter that the second audio device will make or has made to mitigate an overdrive condition.

14. One or more non-transitory computer readable media having instructions thereon that, in response to execution by one or more processing devices of an host device, cause the host device to:
subsequent to provision by the host device of audio data to a master device of a two-wire bus, receive, from the master device, a first dynamics processor (DP) parameter of a first audio device coupled to a first slave device on the two-wire bus, wherein the audio data is to be transmitted over the two-wire bus to a second slave device coupled to a second audio device, the audio data is to be output by the second audio device, and the first DP parameter is provided to the master device along with a synchronization response frame generated by a last slave device on the two-wire bus; and
in response to receipt of the first DP parameter, provide a control instruction for the second audio device to the master device, wherein the master device is to transmit the control instruction to the second slave device over the two-wire bus, and wherein execution of the control instruction is to change a second DP parameter of the second audio device.

15. The one or more non-transitory computer readable media of claim 14, wherein the slave device is the last slave device.

16. The one or more non-transitory computer readable media of claim 14, wherein the first DP parameter includes a change in a compressor circuitry parameter that the first audio device will make or has made to mitigate an overdrive condition, and the control instruction is to cause a change in a compressor circuitry parameter of the second audio device.

17. The one or more non-transitory computer readable media of claim 14, wherein the host device is included in a vehicle head unit.

18. The one or more non-transitory computer readable media of claim 14, wherein execution of the instructions by the one or more processing devices further cause the host device to provide, to the master device, a maximum volume setting for a volume controller coupled to a host device, and wherein the maximum volume setting is to be transmitted over the two-wire bus to the second slave device.

19. A method for distributed audio coordination, comprising:
providing, by a first slave device on a two-wire bus, a synchronization response frame over the two-wire bus toward an upstream device, wherein the first slave device is coupled to a first audio device;
providing, by the first slave device over the two-wire bus toward the upstream device, a first dynamics processor (DP) parameter of the first audio device;
receiving, by the first slave device, a synchronization control frame from the upstream device over the two-wire bus;
recovering, by the first slave device, a clock signal from the synchronization control frame;
receiving, by the first slave device over the two-wire bus, a second DP parameter for a second audio device coupled to a second slave device different from the first slave device; and
providing, by the first slave device to the first audio device, an updated first DP parameter to the first audio device, wherein the updated first DP parameter is based on the second DP parameter.

20. The method of claim 19, further comprising locking a phase locked loop based on a recovered clock signal.

21. The method of claim 19, wherein the first DP parameter includes a compression threshold and the updated first DP parameter has a lower value than the first DP parameter.

22. The method of claim 19, wherein the second slave device provides the second DP parameter to the two-wire bus in response to an overdrive condition of the second audio device.

23. A slave device for two-wire low-latency distributed audio coordination, comprising:

first circuitry to:
receive a synchronization control frame provided over a two-wire bus to the slave device from an upstream device, wherein the two-wire bus has a master device coupled to a host device,
subsequent to receipt of the synchronization control frame, receive, over the two-wire bus from the upstream device, audio data and a maximum volume setting for a volume controller coupled to the host device, and
subsequent to receipt of the audio data and the maximum volume setting, provide a synchronization response frame over the two-wire bus toward the upstream device;

second circuitry to derive timing information from the synchronization control frame, wherein the timing information is used to time provision of the synchronization response frame, by the slave device, subsequent to receipt of the audio data and the maximum volume setting; and third circuitry to:
provide the audio data to an audio device coupled to the slave device, and
provide a control instruction to the audio device to adjust a power output of the audio device based on the maximum volume setting and a maximum power output of the audio device.

24. The slave device of claim 23, wherein the synchronization control frame is a first synchronization control frame, and the first circuitry is further to receive a second synchronization control frame between receipt of the audio data and receipt of the maximum volume setting.

25. The slave device of claim 23, wherein the audio device includes an audio amplifier.

26. The slave device of claim 23, wherein the first circuitry is further to receive, over the two-wire bus from the upstream device, a current volume setting for the volume controller coupled to the host device.

27. The slave device of claim 23, wherein the control instruction includes an instruction to adjust the power output of the audio device to an adjusted level according to a volume-power curve for the audio device in which the maximum volume setting corresponds to the maximum power output.

28. The slave device of claim 23, wherein:
the slave device is a first slave device;
the audio device is a first audio device;
the audio device has a first dynamics processor (DP) parameter;
the first circuitry is further to receive, over the two-wire bus, a second DP parameter for a second audio device coupled to a second slave device on the two-wire bus; and
the third circuitry is to provide an updated first DP parameter to the first audio device, wherein the updated first DP parameter is based on the second DP parameter.

29. A method for low-latency distributed audio coordination, comprising:

receiving, by a slave device, a synchronization control frame provided over a two-wire bus to the slave device from an upstream device, wherein the two-wire bus has a master device coupled to a host device;
receiving, by the slave device over the two-wire bus from the upstream device, a maximum volume setting for a volume controller coupled to the host device;
subsequent to receiving the maximum volume setting, providing, by the slave device, a synchronization response frame over the two-wire bus toward the upstream device;
deriving, by the slave device, timing information from the synchronization control frame, wherein the timing information is used to time provision of the synchronization response frame, by the slave device, subsequent to receiving the maximum volume setting; and
providing, by the slave device, a control instruction to an audio device to adjust a power output of the audio device based on the maximum volume setting and a maximum power output of the audio device.

30. The method of claim 29, further comprising:
receiving, by the slave device over the two-wire bus from the upstream device, a current volume setting for the volume controller;
wherein the control instruction includes an instruction to adjust the power output of the audio device to an adjusted level according to a volume-power curve for the audio device in which the maximum volume setting corresponds to the maximum power output.

* * * * *